(12) United States Patent
Ball

(10) Patent No.: US 7,584,455 B2
(45) Date of Patent: Sep. 1, 2009

(54) PREDICATE-BASED TEST COVERAGE AND GENERATION

(75) Inventor: Thomas J. Ball, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/844,710

(22) Filed: May 12, 2004

(65) Prior Publication Data

US 2005/0229044 A1    Oct. 13, 2005

Related U.S. Application Data

(60) Provisional application No. 60/557,034, filed on Mar. 25, 2004, provisional application No. 60/513,887, filed on Oct. 23, 2003.

(51) Int. Cl.
    *G06F 9/44* (2006.01)
(52) U.S. Cl. .................. 717/124; 717/126; 717/127; 717/131; 717/134
(58) Field of Classification Search ......... 717/124–135; 714/38, 738
    See application file for complete search history.

(56) References Cited

U.S. PATENT DOCUMENTS

| | | | |
|---|---|---|---|
| 5,615,359 A * | 3/1997 | Yung ............................ 707/10 |
| 5,937,195 A * | 8/1999 | Ju et al. ....................... 717/156 |
| 6,463,582 B1 * | 10/2002 | Lethin et al. ................. 717/158 |
| 6,694,290 B1 * | 2/2004 | Apfelbaum et al. ............ 703/22 |
| 6,725,431 B1 * | 4/2004 | Yang ............................. 716/4 |
| 6,834,383 B2 * | 12/2004 | Gillies et al. ................. 717/151 |
| 6,853,963 B1 * | 2/2005 | Apfelbaum et al. ............ 703/2 |
| 6,898,784 B1 * | 5/2005 | Kossatchev et al. ......... 717/126 |
| 6,904,590 B2 | 6/2005 | Ball et al. |
| 6,944,848 B2 * | 9/2005 | Hartman et al. ............. 717/124 |
| 7,055,065 B2 * | 5/2006 | Farchi et al. .................. 714/38 |
| 7,058,925 B2 | 6/2006 | Ball et al. |
| 7,117,484 B2 * | 10/2006 | Hartman et al. ............. 717/126 |
| 2002/0129343 A1 * | 9/2002 | Pinter et al. ................. 717/140 |
| 2003/0014734 A1 * | 1/2003 | Hartman et al. ............. 717/125 |
| 2003/0196191 A1 * | 10/2003 | Hartman et al. ............. 717/126 |

(Continued)

OTHER PUBLICATIONS

Boyapati et al. "Korat: Automated Testing Based on Java Predicates," International Symposium on Software Testing and Analysis, 123-133 (2002) hereinafter Korat.*

(Continued)

*Primary Examiner*—Wei Y Zhen
*Assistant Examiner*—Matthew J Brophy
(74) *Attorney, Agent, or Firm*—Klarquist Sparkman, LLP

(57) ABSTRACT

Techniques and tools for achieving improved test coverage in a finite program state space are described, such as a technique for selecting a set of predicates, calculating a set of possible predicate values, calculating a subset of the set of possible predicate values, and generating a test for the computer program based at least in part on the subset. The subset comprises an approximation (e.g., an under-approximation) of reachable states in the program. A superset of the set of possible predicate values also can be calculated; the superset comprises an over-approximation of the reachable states in the program. In another aspect, a Boolean abstraction of a program is generated, reachability analysis is performed based at least in part on the Boolean abstraction, and symbolic execution is performed to generate test data. The reachability analysis can include computing lower and/or upper bounds of reachable observable states.

23 Claims, 15 Drawing Sheets

Software 180 with Techniques and Tools for Predicate-based Test Coverage and Generation

U.S. PATENT DOCUMENTS

| | | | | |
|---|---|---|---|---|
| 2003/0204834 | A1* | 10/2003 | Ball et al. | 717/106 |
| 2004/0226006 | A1* | 11/2004 | Russell | 717/154 |
| 2004/0255275 | A1* | 12/2004 | Czerwonka | 717/124 |
| 2005/0076331 | A1* | 4/2005 | Das et al. | 717/114 |

OTHER PUBLICATIONS

Tai, Kuo-Chung. "Predicate-Based Test Generation for Computer Programs." International conference on software engineering 15th(1993): 267-276.*

Bush et al., "A Static Analyzer for Finding Dynamic Programming Errors," *Software—Practice and Experience*, 30(7):775-802 (2000).

Clarke, "A System to Generate Test Data and Symbolically Execute Programs," *IEEE Trans. On Software Engineering*, 2(3):215-222 (1976).

Cytron et al., "Compact Representations for Control Dependence", *Proceedings of ACM SIGPLAN 1990, Conference on Programming Language Design and Implementation*, pp. 337-351 (1990).

Duran et al., "A Report on Random Testing", *Proceedings of 5th International IEEE Conference on Software Engineering*, 179-183 (1981).

Goodenough et al., "Toward a Theory of Test Data Selection", *IEEE Trans. Software Engineering*, 1 (2):156-173 (1976).

Graf et al., "Construction of Abstract State Graphs With PVS," *CAV 97: Computer-Aided Verification*, 72-83 (1997).

Gries, *The Science of Programming*, Springer-Verlag (1981).

Howden, "Reliability of the Path Analysis Testing Strategy," *IEEE Trans. on Software Engineering*, 2:208-215 (1976).

Korel, "Dynamic Method of Software Test Data Generation," *Software Testing, Verification and Reliability*, 2(4):203-213 (1992).

Lee et al., "Principles and Methods of Testing Finite State Machines—A Survey", *Proceedings of IEEE*, 84 (8): 1090-1123 (Aug. 1996).

Miller et al., "An Empirical Study of the Reliability of UNIX Utilities", *Comm. of ACM*, 33 (12):32-44 (1990).

Milner, "Communicating and Mobile Systems: the $\pi$ Calculus", *Press Syndicate, University of Cambridge*, pp.

Ntafos, "On Random and Partial Testing," *Proc. International Symposium on Software Testing and Analysis*, 42-48 (1998).

Ramamoorthy, et al., "On the Automated Generation of Program Test Data", *IEEE Trans. Software Engineering*, 2 (4):293-300 (Dec. 1976).

Tai, "Theory of Fault-Based Predicate Testing for Computer Programs", *IEEE Trans. Software Engineering*, 22(8):552-562 (1996).

Yates et al., "Reducing the Effects of Infeasible Paths in Branch Testing," *Proc. Symposium on Software Testing, Analysis and Verification*, 48-54 (1989).

"Compiling to MSIL", http://msdn.microsoft.com/library/en-us/cpguide [Downloaded from the World Wide Web on Dec. 16, 2005].

"Halting Problem—From Math World", http://mathworld.wolfram.com/HaltingProblem.html [Downloaded from the World Wide Web on Dec. 16, 2005].

Allen, "Control Flow Analysis," *SIGPLAN Notices*, 5(7):1-19 (1970).

Ball et al., "Automatic Predicate Abstraction of C Programs," *PLDI 01: Programming Language Design and Implementation*, 203-213 (2001).

Ball et al., "Bebop: A Symbolic Model Checker for Boolean Programs," *SPIN 00: SPIN Workshop*, 113-130 (2000).

Ball et al., "The SLAM Project: Debugging System Software Via Static Analysis," *POPL 02: Principles of Programming Languages*, 1-3 (Jan. 2002).

Beyer et al., "Generating Tests from Counterexamples," *Proc. 26th Int'l Conf. on Software Eng'g*, Edinburgh, Scotland (May 23-28, 2004).

Boyapati et al., "Korat: Automated Testing Based on Java Predicates," *International Symposium on Software Testing and Analysis*, 123-133 (2002).

Boyer et al., "SELECT—A Formal System for Testing and Debugging Programs by Symbolic Execution," *SIGPLAN Notices*, 10(6):234-245 (1975).

Bruns et al., "Model Checking Partial State Spaces With 3-Valued Temporal Logics," *CAV 99:Computer Aided Verification*, 274-287 (1999).

Clarke et al., "Behavioral Consistency of C and Verilog Programs Using Bounded Model Checking," *Design Automation Conference*, 368-371 (Jun. 2003).

de Alfaro et al., "Three-valued Abstractions of Games: Uncertainty, but with Precision," *LICS 04: Proc. 19th IEEE Symposium on Logic in Computer Science*, 10 p. (Jul. 2004).

Giacobazzi et al., "Making Abstract Interpretations Complete," *Journal of the ACM*, 47(2):361-416 (2000).

Godefroid et al., "On the Expressiveness of 3-Valued Models," *VMCAI 03: Verification, Model Checking and Abstract Interpretation*, 206-222, New York (Jan. 2003).

Godefroid, "Reasoning About Abstract Open Systems with Generalized Module Checking," *EMSOFT 03: Conference on Embedded Software*, 223-240, Philadelphia (Oct. 13-15, 2003).

Godefroid et al., "Abstraction-based Model Checking Using Modal Transition Systems," *CONCUR 01: Conference on Concurrency Theory*, 426-440 (2001).

Gotlieb et al., "Automatic Test Data Generation Using Constraint Solving Techniques," *Proceedings of International Symposium on Software Testing and Analysis*, 53-62 (1998).

Gupta et al., "Automated Test Data Generation Using an Iterative Relaxation Method," *FSE 98: Foundations of Software Engineering* (1998).

Harder et al., "Improving Test Suites via Operational Abstraction," *ICSE 2003: Int'l Conf. on Software Eng'g*, Portland, Oregon, pp. 60-71 (May 6-8, 2003).

Jackson et al., "Finding Bugs with a Constraint Solver," *Proc. International Symposium on Software Testing and Analysis*, 14-25 (2000).

Jasper et al., "Test Data Generation and Feasible Path Analysis," *Proc. International Symposium on Software Testing and Analysis*, 95-107 (1994).

Shoham et al., "Monotonic Abstraction-Refinement for CTL," *TACAS 04: Tools and Algorithms for Construction and Analysis of Systems*, LNCS 2988, pp. 546-560, Barcelona (Apr. 2004).

Tai, "Predicate-Based Test Generation for Computer Programs," *Proc. 15th Int'l Conf. on Software Eng'g*, 267-276 (1993).

\* cited by examiner

Software 180 with Techniques and
Tools for Predicate-based Test
Coverage and Generation

Figure 6, prior art

```
    void partition(int a[], int n) {
        int pivot = a[0];
        int lo = 1;
        int hi = n-1;
        assume(n>2);
L0: while (lo <= hi) {
L1:     ;
L2:     while (a[lo] <= pivot) {
L3:         lo++;
L4:         ;
        }
L5:     while (a[hi] > pivot) {
L6:         hi--;
L7:         ;
        }
L8:     if (lo < hi) {
L9:         swap(a,lo,hi);
LA:         ;
        }
LB:     ;
    }
LC: ;
}
```

Figure 7

```
void partition() begin
    decl lt,le,al,ah;
    enforce (!(lt&!le)&
        !(!lt&le&((al&ah)|(!(al|ah)))));
    lt,le,al,ah := T,T,*,*;
L0: while (le) do
L1:     skip;
L2:     while (al) do
L3:         lt,le,al := ch(F,!lt),
                        ch(lt,!lt||!le), *;
L4:         skip;
        od
L5:     while (ah) do
L6:         lt,le,ah := ch(F,!lt),
                        ch(lt,!lt||!le), *;
L7:         skip;
        od
L8:     if (lt) then
L9:         al,ah := !ah,!al;
LA:         skip;
        fi
LB:     skip;
    od
LC: skip;
end
```

|    | TTTT | TTTF | FTTF | FFTF | TTFT | FTFT | FFFT | TTFF | FFFF | FFTT |
|----|------|------|------|------|------|------|------|------|------|------|
| L0 | x    | x    |      |      | x    |      |      | x    | x    |      |
| L1 | x    | x    |      |      | x    |      |      | x    |      |      |
| L2 | x    | x    | x    | x    | x    | x    |      | x    | x    |      |
| L3 | x    | x    | x    | x    |      |      |      |      |      |      |
| L4 | x    | x    | x    | x    | x    | x    |      | x    | x    |      |
| L5 |      |      |      |      | x    | x    | x    | x    | x    |      |
| L6 |      |      |      |      | x    | x    | x    |      |      |      |
| L7 |      |      |      |      | x    | x    | x    | x    | x    |      |
| L8 |      |      |      |      |      |      |      | x    | x    |      |
| L9 |      |      |      |      |      |      |      | x    |      |      |
| LA | x    |      |      |      |      |      |      |      |      |      |
| LB | x    |      |      |      |      |      |      |      | x    |      |
| LC |      |      |      |      |      |      |      |      | x    |      |

```
partition(int a[],int n) {
    assume(n>2);              // prelude
    pivot = a[0];             // prelude
    lo = 1;                   // prelude
    hi = n-1;                 // prelude assume(lo<=hi);           // L0:TTTF -> L1:TTTF
    ;                         // L1:TTTF -> L2:TTTF
    assume(a[lo]<=pivot);     // L2:TTTF -> L3:TTTF
    lo=lo+1;                  // L3:TTTF -> L4:TTFF
    ;                         // L4:TTFF -> L2:TTFF assert(! ((lo<hi)&&(lo<=hi)&&
        !(a[lo]<=pivot)&&!(a[hi]>pivot))
        );
}
```

Figure 11

| Leaf | Input Array | CBMC Result | Bounds Failure? |
|---|---|---|---|
| L1:TTFF | { 1, 3, 0 } | assert | No |
| L1:TTFT | { 0, 2, 1 } | assert | No |
| L2:FFFF | { 0, -7, -8 } | assert | Yes |
| L2:TTFF | { 1, -7, 3, 0 } | assert | No |
| L3:FFTF | { 0, -7, -8 } | assert | Yes |
| L4:TTTF | { 1, -7, -7, 0 } | assert | Yes |
| L4:TTTT | { 0, -8, -8, 1 } | assert | No |
| L6:FFFT |  | infeasible | No |
| L7:FTFT | { 0, -8, 1, 2 } | assert | No |
| L7:TTFT | { 0, -8, 3, 0, 1, 2 } | assert | No |
| LB:TTTT | { 0, -7, 1, 0, -8, 2 } | assert | No |
| LC:FFFF | { 0, -8, 1 } | assert | No |

| Leaf | Input Array | CBMC Result | Bounds Failure? |
|---|---|---|---|
| L1:TTFF | { 1, 3, 0 } | assert | No |
| L1:TTFT | { 0, 2, 1 } | assert | No |
| L2:FFFF | { 0, -7, -8 } | assert | No |
| L2:TTFF | { 1, -7, 3, 0 } | assert | No |
| L4:TTTF | { 1, -7, -7, 0 } | assert | No |
| L4:TTTT | { 0, -8, -8, 1 } | assert | No |
| L7:FTFT | { 0, -8, 1, 2 } | assert | No |
| L7:TTFT | { 0, -8, 3, 0, 1, 2 } | assert | No |
| LB:TTTT | { 0, -7, 1, 0, -8, 2 } | assert | No |
| LC:FFFF | { 0, -8, 1 } | assert | No |
| LC:FFFT |  | infeasible | No |
| LC:FFTF | { 0, -7, -8 } | assert | No |

Figure 13

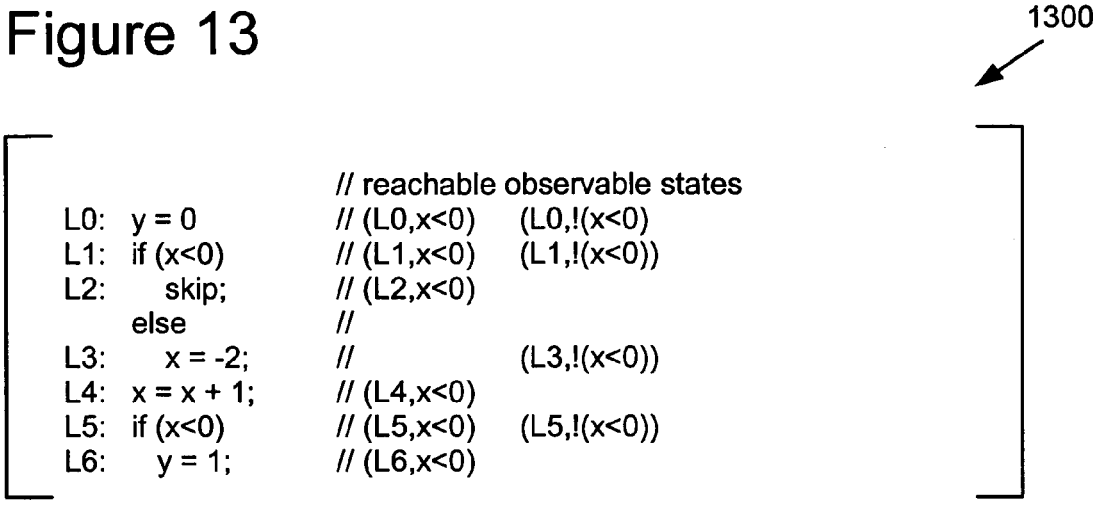

```
                    // reachable observable states
L0:  y = 0          // (L0,x<0)    (L0,!(x<0)
L1:  if (x<0)       // (L1,x<0)    (L1,!(x<0))
L2:     skip;       // (L2,x<0)
     else           //
L3:     x = -2;     //             (L3,!(x<0))
L4:  x = x + 1;     // (L4,x<0)
L5:  if (x<0)       // (L5,x<0)    (L5,!(x<0))
L6:     y = 1;      // (L6,x<0)
```

Figure 14

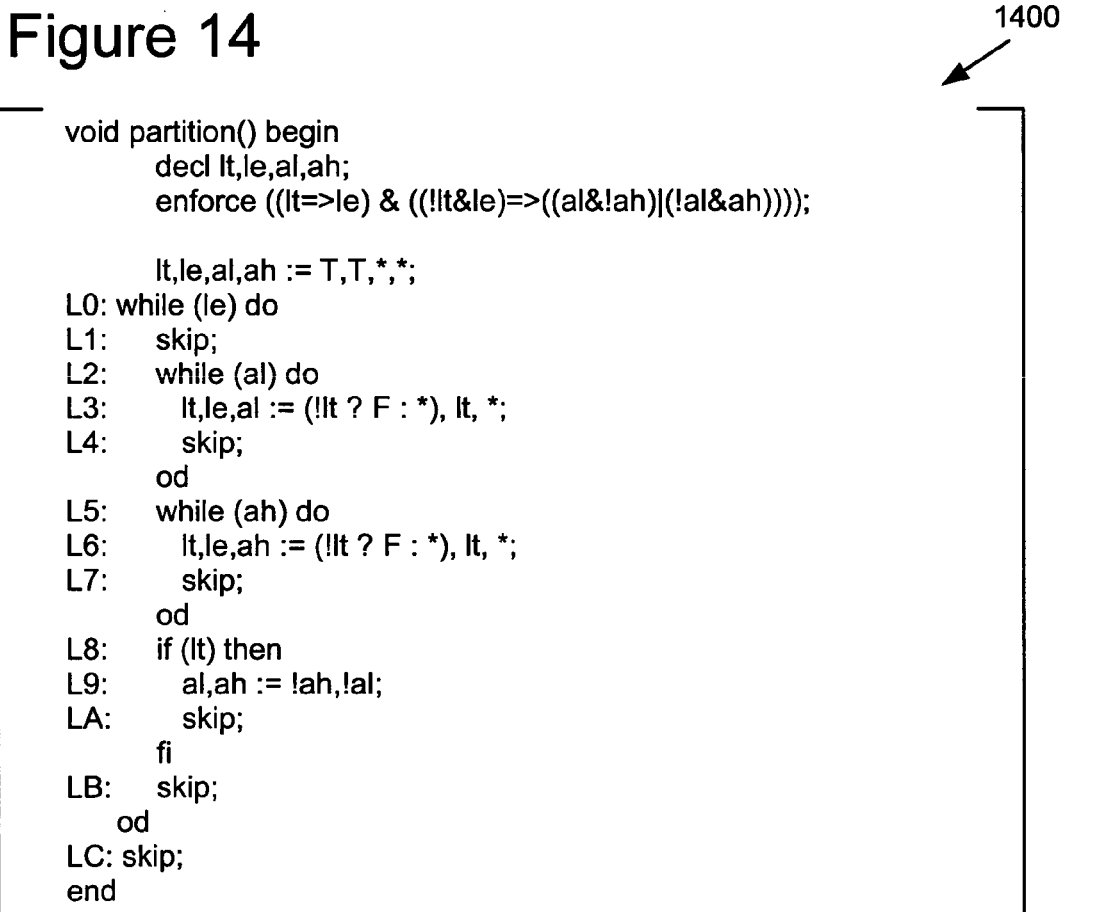

```
void partition() begin
     decl lt,le,al,ah;
     enforce ((lt=>le) & ((!lt&le)=>((al&!ah)|(!al&ah))));

lt,le,al,ah := T,T,*,*;
L0: while (le) do
L1:    skip;
L2:    while (al) do
L3:       lt,le,al := (!lt ? F : *), lt, *;
L4:       skip;
       od
L5:    while (ah) do
L6:       lt,le,ah := (!lt ? F : *), lt, *;
L7:       skip;
       od
L8:    if (lt) then
L9:       al,ah := !ah,!al;
LA:       skip;
       fi
LB:    skip;
    od
LC: skip;
end
```

| Path Endpoints | Generated Input Array | Bounds Error? |
|---|---|---|
| (L0:TTTT, L4:FTFT) | { 0, -8, 1 } | No |
| (L0:TTTT, L4:TTFT) | { 0, -8, 2, 1 } | No |
| (L0:TTTT, L4:TTTT) | { 0, -8, -8, 1 } | No |
| (L0:TTTF, L4:TTFF) | { 1, -7, 3, 0 } | No |
| (L0:TTTF, L4:FTTF) | { 0, -7, -8 } | Yes |
| (L0:TTTF, L4:TTTF) | { 1, -7, -7, 0 } | Yes |
| (L0:TTFT, L7:TTFF) | { 0, 2, -8, 1 } | No |
| (L0:TTFT, L7:FTFT) | { 0, 1, 2 } | No |
| (L0:TTFT, L7:TTFT) | { 0, 3, 1, 2 } | No |
| (L0:TTFF, L0:TTTT) | { 1, 2, -1, 0 } | No |

```
partition(int a[],int n) {
  pivot = a[0];              // prelude
  lo = 1;                    // prelude
  hi = n-1;                  // prelude
  assume(n>2);               // prelude assume(lo<=hi);            // L0:TTTF -> L1:TTTF
  ;                          // L1:TTTF -> L2:TTTF
  assume(a[lo]<=pivot);      // L2:TTTF -> L3:TTTF
  lo=lo+1;                   // L3:TTTF -> L4:TTFF assert(! ((lo<hi)&&(lo<=hi)&&
         !(a[lo]<=pivot)&&!(a[hi]>pivot))
      );
}
```

PREDICATE-BASED TEST COVERAGE AND GENERATION

RELATED APPLICATION INFORMATION

This application claims the benefit of U.S. Provisional Patent Application No. 60/557,034, entitled "Predicate-Complete Test Coverage and Generation," filed Mar. 25, 2004, and U.S. Provisional Patent Application No. 60/513,887, entitled, "Abstraction-Guided Test Generation: A Case Study," filed Oct. 23, 2003, which are incorporated herein by reference.

FIELD

This application relates to computer program testing, and more particularly relates to test coverage and test generation in computer program testing.

BACKGROUND

In the field of computer program testing, different approaches have been developed to more accurately and completely test program function. For example, control-flow-based test generation seeks to cover at a minimum all the statements or branches in a program ("statement coverage" or "branch coverage"). In multiple condition coverage, each possible condition of each statement is tested at a local level. For example, in a statement of the form if (x||y) then a else b, multiple condition coverage would locally test whether the statement performs as expected where x is true and y is false, where y is true and x is false, where both x and y are true, or where both x and y are false. Path coverage is an extension of multiple condition coverage that seeks to test all possible paths through a program. The idea of using paths and symbolic execution of paths to generate tests has a long and rich history going back to the mid-1970's and continuing to the present day. See, e.g., Boyer et al., "SELECT—A Formal System for Testing and Debugging Programs by Symbolic Execution," *SIGPLAN Notices*, 10(6):234-245 (1975); Howden, "Reliability of the Path Analysis Testing Strategy," *IEEE Trans. on Software Engineering*, 2:208-215 (1976); Clarke, "A System to Generate Test Data and Symbolically Execute Programs," *IEEE Trans. on Software Engineering*, 2(3):215-222 (1976); Jasper et al., "Test Data Generation and Feasible Path Analysis," *Proc. Int'l Symposium on Software Testing and Analysis*, 95-107 (1994); Gotlieb et al., "Automatic Test Data Generation Using Constraint Solving Techniques," *Proc. Int'l Symposium on Software Testing and Analysis*, 53-62 (1998); Gupta et al., "Automated Test Data Generation Using an Iterative Relaxation Method," *FSE 98: Foundations of Software Engineering* (1998). Path coverage is notoriously difficult to work with as a coverage metric because there are an unbounded number of paths in programs with loops, which characterizes most existing non-trivial programs.

A classic problem in path-based symbolic execution is the selection of program paths. One way to guide the search for feasible paths is to execute the program symbolically along all paths, while guiding the exploration to achieve high code coverage. Clearly, it is not possible to symbolically execute all paths, so the search must be cut off at some point. Often, tools will simply analyze loops through one or two iterations. See Bush et al., "A Static Analyzer for Finding Dynamic Programming Errors," *Software—Practice and Experience*, 30(7):775-802 (2000). Another way to limit the search is to bound the size of the input domain (say, to consider arrays of at most length three) or to bound the maximum path length that will be considered, as done in bounded model checking. See, e.g., Jackson et al., "Finding Bugs with a Constraint Solver," *Proc. Int'l Symposium on Software Testing and Analysis*, 14-25 (2000). An experiment by Yates and Malevris provided evidence that the likelihood that a path is feasible decreases as the number of predicates in the path increases. This led them to use shortest-path algorithms to find a set of paths that covers all branches in a function. See Yates et al., "Reducing the Effects of Infeasible Paths in Branch Testing," *Proc. Symposium on Software Testing, Analysis, and Verification*, 48-54 (1989).

Automatically created Boolean program abstraction can be used to analyze program behavior. See, e.g., Graf et al., "Construction of Abstract State Graphs with PVS," *CAV 97: Computer-aided Verification*, 72-83 (1997); Ball et al., "Automatic Predicate Abstraction of C programs," *PLDI 01: Programming Language Design and Implementation*, 203-213 (2001).

Other approaches to test generation rely on dynamic schemes. Given an existing test t, Korel's "goal-oriented" approach seeks to perturb t to a test t' covering a particular statement, branch or path using function minimization techniques. See Korel, "Dynamic Method of Software Test Data Generation," *Software Testing, Verification and Reliability*, 2(4):203-213, (1992). The potential benefit of Korel's approach is that it is dynamic and has an accurate view of memory and flow dependences. The downside of Korel's approach is that test t may be very far away from a suitable test t'.

Another approach to test generation is found in the Korat tool. See Boyapati et al., "Korat: Automated Testing Based on Java Predicates," *Proc. Int'l Symposium on Software Testing and Analysis*, 123-133 (2002). This tool uses a function's precondition on its input to automatically generate all (non-isomorphic) test cases up to a given small size. It exhaustively explores the input space of the precondition and prunes large portions of the search space by monitoring the execution of the precondition. For a program that has no constraints on its input, the Korat method may not work very well. Furthermore, it requires the user to supply a bound on the input size.

Work on three-valued model checking by Bruns, Godefroid, Huth and Jagadeesan shows how to model incomplete (abstract) systems using modal transition systems (equivalently, partial Kripke Structures). See, e.g., Bruns et al., "Model Checking Partial State Spaces with 3-valued Temporal Logics," *CAV 99: Computer Aided Verification*, 274-287 (1999); Godefroid et al., "Abstraction-based Model Checking Using Modal Transition Systems," *CONCUR 01: Conf. on Concurrency Theory*, 426-440 (2001). Their work gives algorithms for model checking temporal logic formulae with respect to such systems.

Random or fuzz testing is another popular technique for unit testing. See, e.g., Ntafos, "On Random and Partition Testing," *Proc. Int'l Symposium on Software Testing and Analysis*, 42-48 (1998).

Of course, if a designer provides a specification of the expected behavior of a software system, this specification can be used to drive test generation as well.

Although it is useful to know whether a statement in a program functions correctly when it is tested at a local level, it is also useful to know whether the behavior of the statement is still appropriate as the state of the computer program changes over time. However, because path coverage is not achievable in most programs, there exists a need for test generation techniques and tools that improve upon statement coverage or multiple condition coverage while working within a finite set of program states.

SUMMARY

In summary, techniques and tools for achieving improved test coverage in a finite program state space are described.

In one aspect, a method of computer program test generation includes selecting a set of predicates in the computer program, calculating a set of possible predicate values for plural statements in the computer program, calculating a subset of the set of possible predicate values (e.g., possible Boolean values) for the plural statements in the computer program, and generating a test for the computer program based at least in part on the subset. The subset comprises an approximation (e.g., an under-approximation) of reachable observable states in the computer program. A Boolean program can be generated based on the selected set of predicates. A superset of the set of possible predicate values also can be calculated; the superset comprises an over-approximation of the reachable observable states in the program.

In another aspect, a set of expressions that each evaluate to a Boolean value is selected. A set of possible values for plural statements in the computer program is calculated based on the selected set of expressions. A subset of the set of possible values for the plural statements in the program is calculated, and a test for the computer program is generated using the subset. The subset comprises an approximation of possible program states for the computer program.

In another aspect, a Boolean abstraction of a program is generated. Reachability analysis of the computer program is performed, which includes finding a set of reachable observable states of the computer program. The reachability analysis is based at least in part on the Boolean abstraction. Symbolic execution is performed to generate test data for testing the computer program. The reachability analysis can include, for example, computing a lower bound of reachable observable states of the computer program, and/or computing an upper bound of the reachable observable states of the computer program.

In another aspect, an upper bound and a lower bound for a set of reachable observable states in the computer program are defined. The upper bound and the lower bound are used to form a behavior model of the computer program. Defining the lower bound can include computing a pessimistic lower bound and/or an optimistic lower bound. Test generation can be performed based at least in part on the behavior model. The test generation can include generating tests for a subset of the reachable observable states defined by the lower bound prior to generating tests for other reachable observable states. Subsequent refinement of the upper and/or lower bounds can be performed, such as by increasing the lower bound (e.g., by refining Boolean abstraction, such as by introducing additional predicates), or by decreasing the upper bound. The increased lower bound and/or decreased upper bound can then be used in test generation.

In another aspect, an over-approximated superset of reachable observable states in the computer program is determined, and an under-approximated subset of reachable observable states in the computer program is determined. The superset and the subset are used in test generation for the computer program. The superset includes each actually reachable observable state in the computer program, and the subset includes provably reachable observable states in the computer program.

In another aspect, a computer system for performing test generation for computer programs includes means for selecting a set of predicates in a computer program, means for calculating a set of possible predicate values for plural statements in the computer program, means for calculating a subset of the set of possible predicate values for the plural statements in the computer program, the subset comprising an approximation of reachable states in the computer program, and means for generating a test for the computer program using the subset.

The various techniques and tools can be used in combination or independently. Different embodiments implement one or more of the described techniques and tools.

Additional features and advantages will be made apparent from the following detailed description of different embodiments that proceeds with reference to the accompanying drawings.

BRIEF DESCRIPTION OF THE DRAWINGS

FIG. 7 is a code listing showing a Boolean program abstraction of the partition function shown in FIG. 6 with respect to four observed predicates.

FIG. 8 is a table showing reachable states in a Boolean program abstraction of the partition function.

FIG. 10 is a code diagram showing program code for the partition function corresponding to the path L0:TTTF→L1: TTTF→L2:TTTF→L3:TTTF→L4:TTFF→L2:TTFF in FIG. 9.

FIG. 11 is a table showing results of running the CBMC bounded model checker on programs corresponding to twelve paths to leaf vertices shown in FIG. 9.

FIG. 12 is a table showing results of running the CBMC bounded model checker on programs corresponding to twelve paths to leaf vertices shown in FIG. 9 after modifying the partition function eliminate two array bounds violations.

FIG. 13 is a code listing showing a loop-free program and reachable observable states for the program.

FIG. 14 is a code listing showing another Boolean program abstraction of the partition function shown in FIG. 6 with respect to four observed predicates.

FIG. 19 is a code diagram showing program code for the partition function corresponding to the path L0:TTTF→L1: TTTF→L2:TTTF→L3:TTTF→L4:TTFF in FIG. 15.

DETAILED DESCRIPTION

Described implementations are directed to computer program test coverage improvement. Described implementations can achieve higher test coverage in computer program code testing without sacrificing efficiency.

For example, in one technique, test generation includes selecting a set of predicates in the computer program, calculating a set of possible predicate values for plural statements in the computer program, calculating a subset of the set of possible predicate values for the plural statements in the computer program, and generating a test for the computer program using the subset. The subset comprises an approximation (e.g., an under-approximation or lower bound) of reachable states in the computer program.

Although operations for the various techniques are described in a particular, sequential order for the sake of presentation, it should be understood that this manner of description encompasses minor rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques. As another example, although some implementations are described with reference to specific testing tools, other tools also can be used.

The various techniques and tools can be used in combination or independently. Different embodiments implement one or more of the described techniques and tools.

I. Computing Environment

The techniques and tools described herein can be implemented on any of a variety of computing devices and environments, including computers of various form factors (personal, workstation, server, handheld, laptop, tablet, or other mobile), distributed computing networks, and Web services, as a few general examples. The techniques and tools can be implemented in hardware circuitry, as well as in software executing within a computer or other computing environment, such as shown in FIG. 1.

Figure 1:
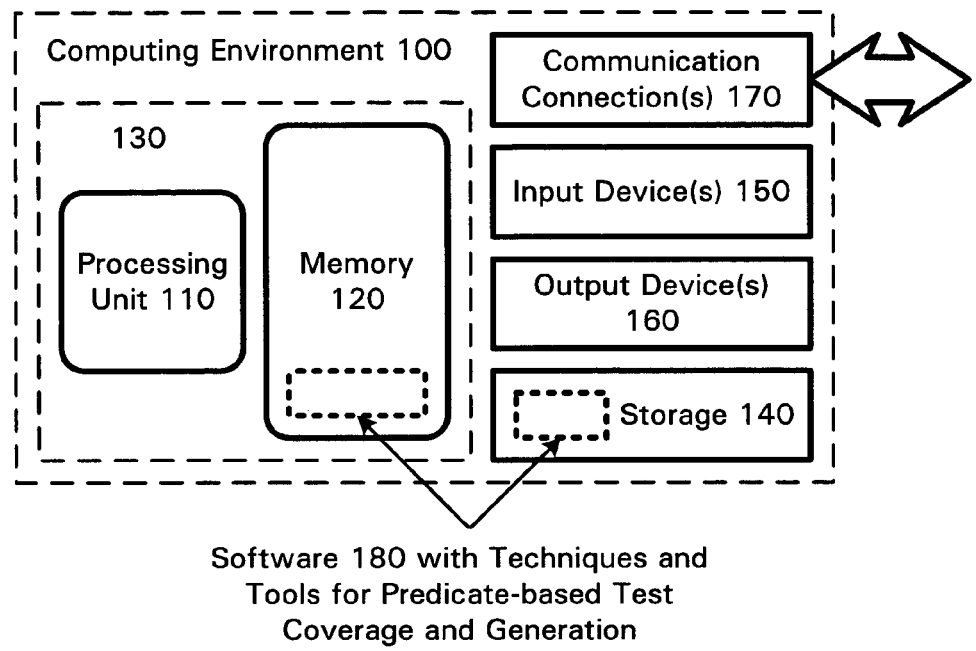
FIG. 1 is a block diagram of a suitable computing environment for implementing described techniques and tools for computer program test generation.

FIG. 1 illustrates a generalized example of a suitable computing environment 100 in which described techniques and tools can be implemented. The computing environment 100 is not intended to suggest any limitation as to scope of use or functionality of the invention, as the present invention may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing described techniques and tools for computer program testing.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which can be used to store information and which can be accessed within the computing environment 100. For example, the storage 140 stores instructions for implementing software 180.

The input device(s) 150 may be a touch input device such as a keyboard, mouse, pen, or trackball, a voice input device, a scanning device, or another device that provides input to the computing environment 100. The output device(s) 160 may be a display, printer, speaker, CD-writer, or another device that provides output from the computing environment 100.

The communication connection(s) 170 enable communication over a communication medium to another computing entity. The communication medium conveys information such as computer-executable instructions, audio/video or other media information, or other data in a modulated data signal. By way of example, and not limitation, communication media include wired or wireless techniques implemented with an electrical, optical, RF, infrared, acoustic, or other carrier.

Techniques and tools described herein can be described in the general context of computer-readable media. Computer-readable media are any available media that can be accessed within a computing environment. By way of example, and not limitation, with the computing environment 100, computer-readable media include memory 120, storage 140, and combinations of any of the above.

Some techniques and tools herein can be described in the general context of computer-executable instructions, such as those included in program modules, being executed in a computing environment on a target real or virtual processor. Generally, program modules include functions, programs, libraries, objects, classes, components, data structures, etc. that perform particular tasks or implement particular abstract data types. The functionality of the program modules may be combined or split between program modules as desired. Computer-executable instructions may be executed within a local or distributed computing environment.

II. Techniques and Tools for Predicate-Based Testing

Many errors that go undetected in conventional program testing are due to complex correlations between program predicates (which control the execution of statements) and program statements (which in turn affect the values of the predicates). A predicate is an expression that evaluates to a Boolean value. In other words, a predicate maps a state to a Boolean value. For example, the predicate (x>0) indicates whether or not variable x has a positive value in a given state. Predicates can be drawn from the conditional statements and assertions in a program, as well as from implicit run-time "safety" checks (e.g., checking for array bound violations and division by zero) or from automated analysis, or from the programmer. Predicates can be used, for example, to generate a Boolean program abstracted from a program under test. The program under test can be a program written in C or some other programming language).

Described implementations include techniques and tools for test generation based on reachable observable states. An observable state of a computer program is an evaluation of n predicates under some program state at a statement in the program. While the set of possible program states in most programs (e.g., programs with loops) is unbounded, in a program with m statements and n predicates, the size of the set of observable states S is at most $m(2^n)$. A reachable observable state is an observable state that the program being tested can actually be in. An example of an observable state that is not reachable is an observable state with an inherent logical contradiction (e.g., (x>0&& x<0)).

Figure 2:
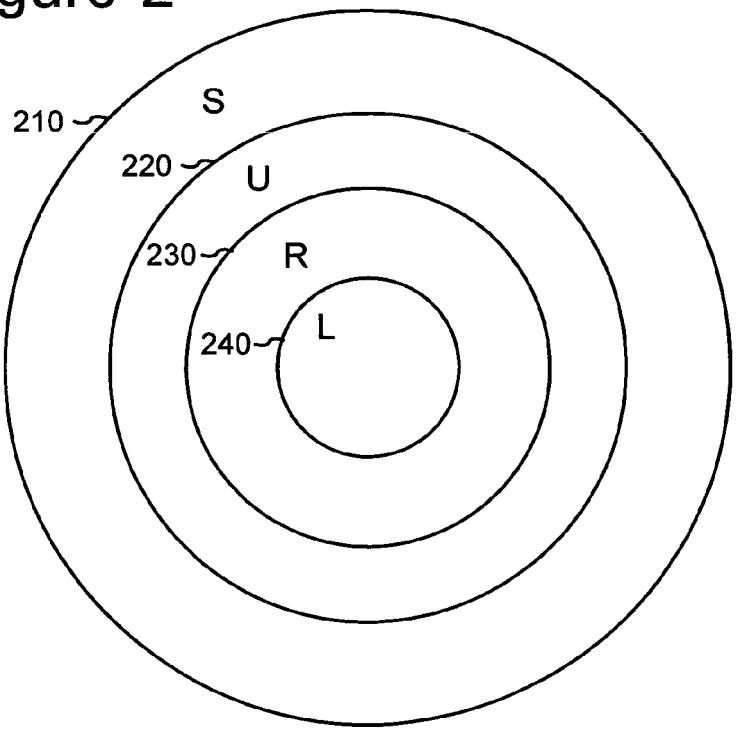
FIG. 2 is a diagram of sets of states in a computer program.

For example, a test coverage scenario is described that includes the concepts of over-approximation (upper bound) of reachable observable states and under-approximation (lower bound) of reachable observable states. FIG. 2 shows a set 210 of states S which contains all observable states of a program. Within S are several subsets (220, 230, 240) of the observable states. The subset U (an upper bound) contains states that "may" be reachable observable states; the subset R contains states that are "actually" reachable observable states in the program; and the subset L (a lower bound) contains states that must be (i.e., can be proven to be) reachable observable states. (Although U is a subset of S, U is also a superset of R. L is a subset of S and is also a subset of R.) The difference between U and L represents the uncertainty in the system of the actual number of reachable observable states.

In described implementations, the goal of testing coverage is to minimize the difference between U and L (e.g., by increasing the lower bound), such that the observable states that must be reachable in the program represent a greater percentage of the observable states that may be reachable in the program. As the ratio |L|/|U| approaches 1.0, the testing system approaches complete coverage of reachable observable states in the program. In some embodiments, a testing system covers states in L first (i.e., prior to covering states outside of L).

Figure 3:
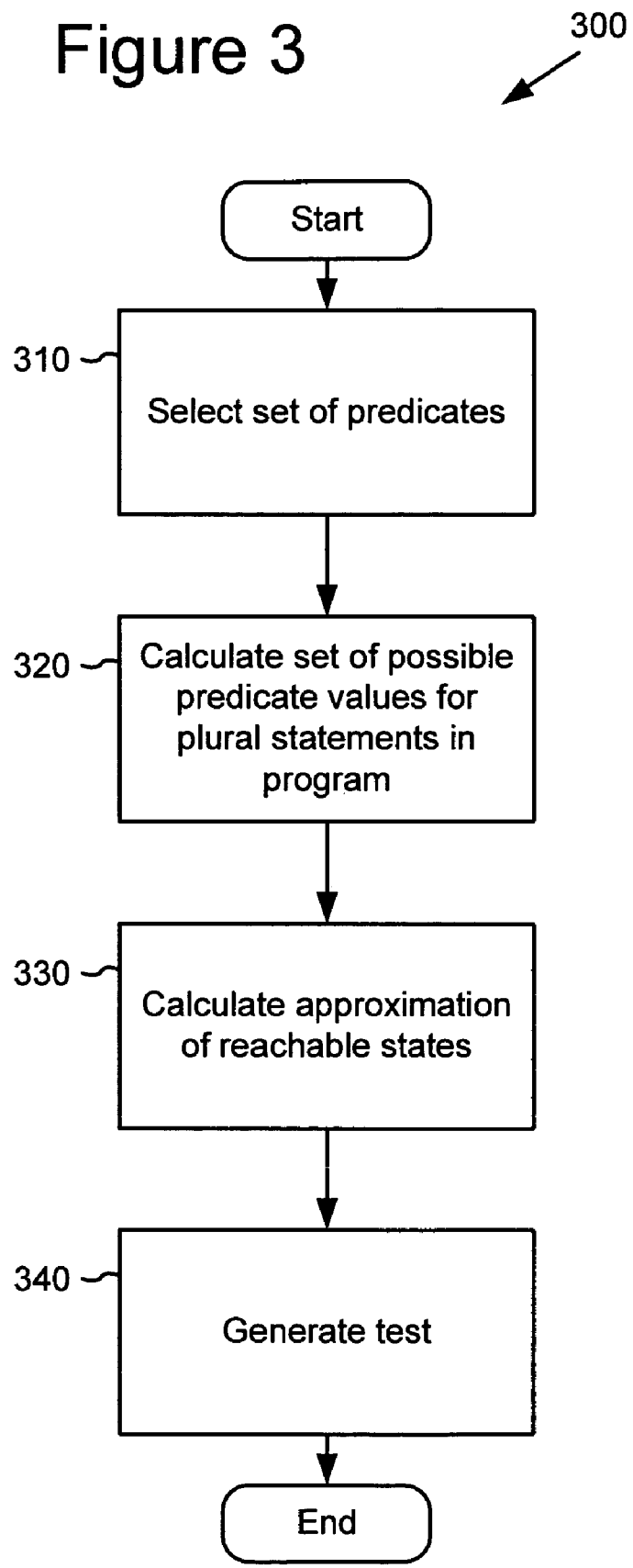
FIG. 3 is a flow chart showing a technique for performing test generation by approximating reachable states in a computer program.
Figure 4:
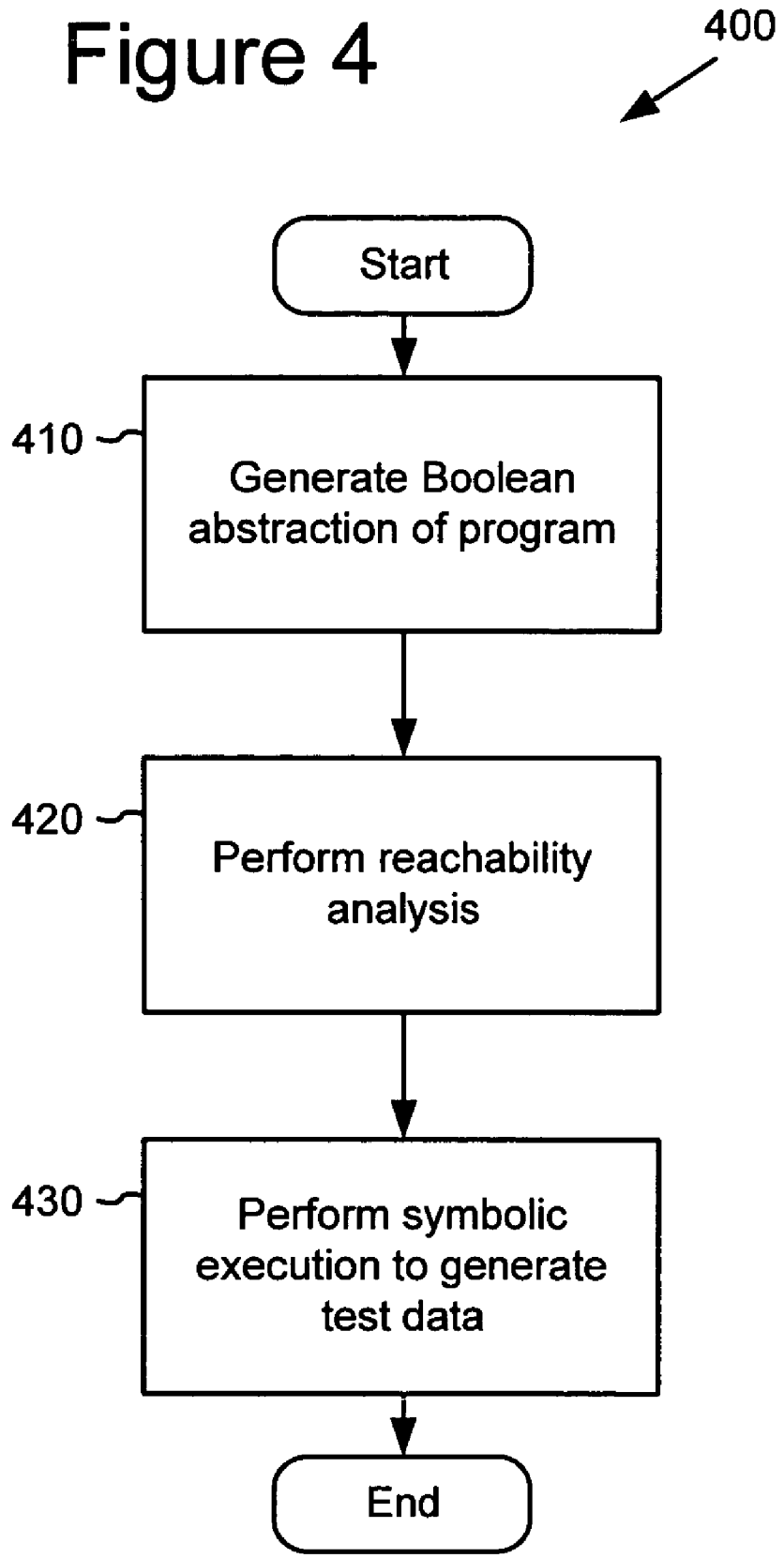
FIG. 4 is a flow chart showing a technique for performing test generation by performing reachability analysis based at least in part on a Boolean abstraction of a computer program.
Figure 5:
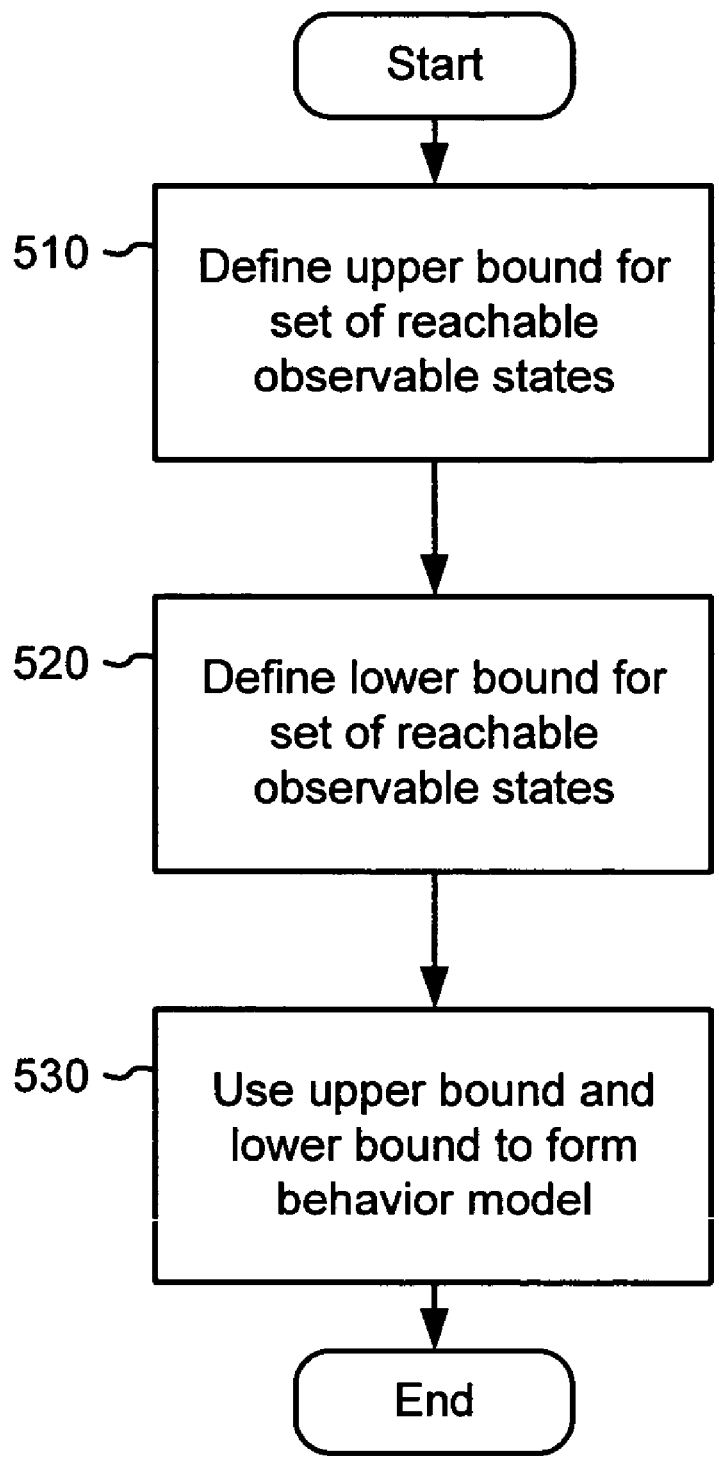
FIG. 5 is a flow chart showing a technique for modeling behavior of a computer program by defining upper and lower bounds of a set of reachable observable states.

FIGS. 3, 4, and 5 show exemplary techniques in some implementations. The techniques can be performed, for example, using some combination of automatic test generation and/or program analysis tools (e.g., Boolean abstraction tools, model checking tools, symbolic execution tools, etc.), or using some other kind of tool and/or analysis (such as programmer analysis). For example, Boolean program abstraction provides a denominator by which the test generation effectiveness of a set of predicates can be assessed. Boolean abstraction is based on observations over the state space of the program. These observations can be taken directly from the code (as they appear in conditionals) or provided by programmers or testers. Boolean program abstraction makes it possible for the programmer or tester to increase the level of testing thoroughness through the addition of new observations.

FIG. 3 is a flow chart showing a technique 300 for performing test generation by approximating reachable states in a computer program. At 310, a set of predicates is selected for a computer program. For example, the set of predicates can be obtained by analyzing (e.g., by automatic analysis) conditional statements and assertions in the program. Alternatively, the set of predicates is obtained by analyzing other aspects of the program or in some other manner. At 320, a set of possible predicate values (e.g., possible combinations of Boolean values for the predicates) for plural statements in the program (e.g., a set of statements comprising a portion of or all of the program) is calculated. At 330, an approximation (e.g., an under-approximation and/or an over-approximation) of reachable states is calculated (e.g., in the form of a subset of the set of possible predicate values for the plural statements). At 340, test generation is performed based at least in part on the approximation.

FIG. 4 is a flow chart showing a technique 400 for performing test generation by performing reachability analysis based at least in part on a Boolean abstraction of a computer program. At 410, a Boolean abstraction of the program is generated. For example, the Boolean abstraction is generated in the form of a Boolean program by an automatic Boolean abstraction tool. Alternatively, the Boolean abstraction is generated in some other manner. At 420, reachability analysis is performed (e.g., by approximating the set of reachable observable states for the program. At 430, symbolic execution is performed (e.g., by a symbolic execution tool) to generate test data for the program.

FIG. 5 is a flow chart showing a technique 500 for modeling behavior (e.g., through reachability analysis) of a computer program by defining upper and lower bounds of a set of reachable observable states. At 510, an upper bound of a set of reachable observable states for the program is defined, and at 520, a lower bound for the set is defined. At 530, the upper and lower bounds are used to form a behavior model for the program. The behavior model can be used, for example, in subsequent test generation for the program.

III. A First Combined Implementation of Described Techniques and Tools

The following example describes techniques for using predicate abstraction and model checking to guide test case generation via symbolic execution. The features and limitations described in this example vary in other implementations.

In this example, an automated behavioral approach is defined to unit test generation of C code based on three steps: (1) predicate abstraction of the C code generates a Boolean abstraction based on a set of observations (predicates); (2) reachability analysis of the Boolean abstraction computes an over-approximation to the set of observable states and generates a small set of paths to cover these states; (3) symbolic execution of the C code generates tests to cover the paths. This approach improves upon a variety of test generation approaches based on covering code and deals naturally with the difficult issue of infeasible program paths that plagues many code-based test generation strategies.

A. Introduction

In this example, unit test generation is re-oriented to focus on covering important aspects of a program's behavior rather than its structure, and an automated process to achieve good behavioral coverage is defined. Good code coverage can be achieved as a side-effect of achieving good behavioral coverage.

The reachable states of a program are a window into its behavior. While a program may have an unbounded number of reachable states, at any point in time there usually are only a finite number of observations about these states that will be interesting to test. Predicates are a way to observe program behavior and bound the number of observed states, as there are a finite number of control locations in a program and a finite number of observations ($2^n$) that can be made at each such location. An observer o is a vector of n predicates. The observed state o(s) corresponding to state s is a vector of Boolean values (paired with a program location) constructed by applying each predicate in o to state s.

In this example, an automatic process for creating test data to achieve high behavioral coverage of a program P is defined. The input to the process is a set of predicates E observing states of P. Given these predicates, the process has three main steps, which are based on existing algorithms and tools in this example:

Using predicate abstraction, a Boolean program BP(P,E) is automatically created from a C program P and predicates E. (A Boolean program has all the control-flow constructs of C but only permits variables with Boolean type.) Each predicate $e_i$ in E has a corresponding Boolean variable $b_i$ in BP(P,E) that conservatively tracks the value of $e_i$. The Boolean program is an abstraction of program P in that every feasible execution path of P is a feasible execution path of BP(P,E).

Reachability analysis of the Boolean program using a symbolic model checker (e.g., the "Bebop" model checker described in Ball et al., "Bebop: A Symbolic Model Checker for Boolean Programs," *SPIN 00: SPIN Workshop*, 113-130 (2000)) yields an over-approximation $S_E$ to the set of observable reachable states of P. In this example, the Bebop symbolic model checker is modified to output a small set of paths $P(S_E)$ that covers all states in $S_E$.

A symbolic simulator for C (e.g., a SAT-based symbolic simulator) determines if each path $p_s$ in $P(S_E)$ is feasible in the source program P and generates an input to cover $p_s$ if it is feasible.

In this example, the above three steps are completely automatic. Selection of the predicates E is important. If E is the empty set then the Boolean abstraction will be imprecise and very few paths chosen by the model checker will be feasible. Let $F(S_E)$ be the subset of paths in $P(S_E)$ that are feasible paths in the source program P. The ratio $|F(S_E)|/|P(S_E)|$ gives us a measure of the adequacy of a set of observations E. The closer the ratio is to one, the closer the Boolean abstraction BP(P,E) approximates the program P. Choosing the set of predicates from the conditionals in a program is a good start to achieving a high coverage ratio.

The following case study brings these ideas into focus.

B. Case Study

Figure 6:
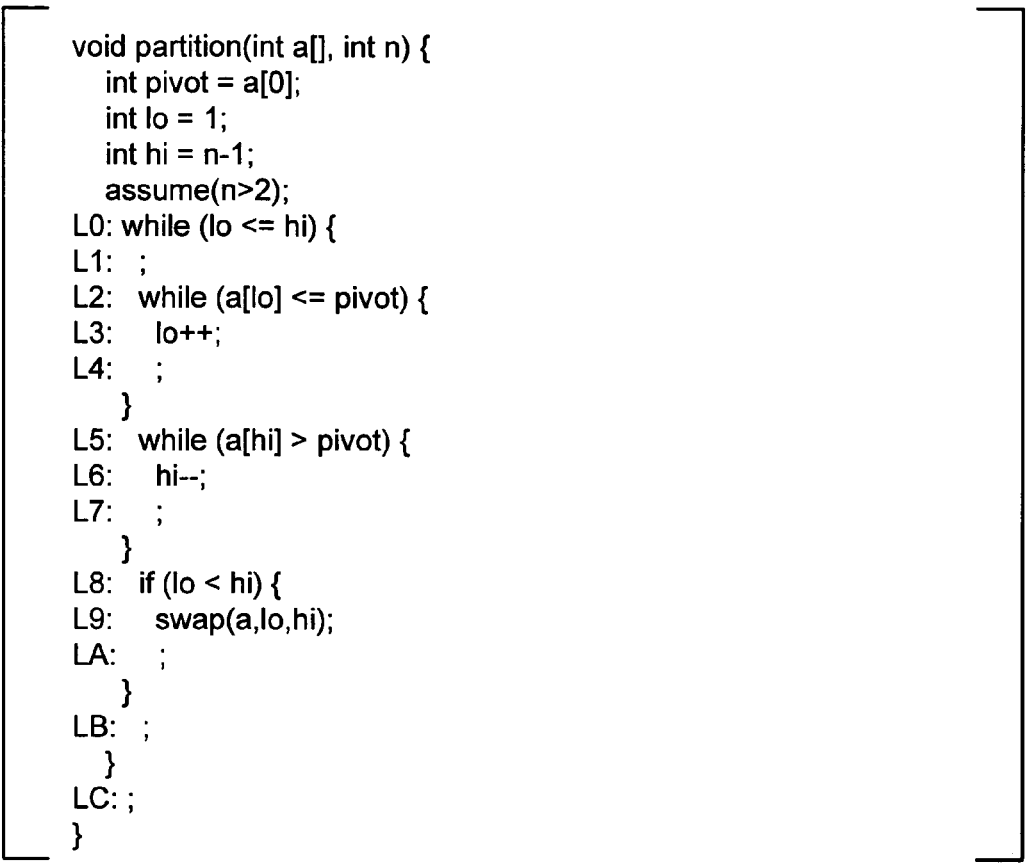
FIG. 6 is a code listing showing program code for a partition function according to the prior art.

FIG. 6 presents a (buggy) example of QuickSort's partition function 600, a classic example that has been used to study test generation. See, e.g., Boyer et al., "SELECT—A Formal System for testing and debugging programs by symbolic execution," *SIGPLAN Notices*, 10(6):234-45 (1975). Various control points and labels have been added to the code for explanatory purposes. The goal of the function is to permute the elements of the input array so that the resulting array has two parts: the values in the first part are less than or equal to the chosen pivot value a[0]; the values in the second part are greater than the pivot value. There is an array bound check missing in the code that can lead to an array bounds error: the check at the while loop at label L2 should be (lo<=hi && a[lo]<=pivot). (The loop at L5 cannot decrement hi to take a value less than zero because the value of variable pivot is fixed to be the value of a[0].) This error only can be uncovered by executing the statement lo++ at label L3 at least twice.

1. Observations

There are thirteen statements/labels in the partition function 600, but an unbounded number of paths. If the number of iterations of each loop in the function are bounded to be no greater than k, than the total number of paths is $f(k)=1+(2(1+k)^2)^k$, which grows very quickly. Which of these many paths should be tested? Which are feasible and which are infeasible? Clearly, paths are not a very good way to approach testing of this function.

Instead of reasoning in terms of paths, this example uses predicates to observe the states of the partition function 600. Let us observe the four predicates that appear in the body of the function: (lo<hi), (lo<=hi), (a[lo]<=pivot), and (a[hi]>pivot). An observed state thus is a bit vector of length four (lt; le; al; ah), where lt corresponds to (lo<hi), le corresponds to (lo<=hi), al corresponds to (a[lo]<=pivot), and ah corresponds to (a[hi]>pivot). There only are ten feasible valuations for this vector, as six are infeasible because of correlations between the predicates:

If !(lo<hi)&&(lo<=hi) then (lo==hi) and so exactly one of the predicates in the set {(a[lo]<=pivot), (a[hi]>pivot)} must be true. Thus, the two valuations FTFF and FTTT are infeasible.

Since (lo<hi) implies (lo<=hi), the four valuations TFFF, TFTT, TFFT and TFTF are infeasible.

Since there are thirteen labels in the code and ten possible valuations, there is a state space of 130 observable states in the worst-case. However, as explained below, the number of reachable observable states in this example is far less.

2. Boolean Abstraction

FIG. 7 shows a Boolean program abstraction of the partition function 600 (FIG. 6) with respect to the four observed predicates. This Boolean program 700 can be automatically constructed (e.g., using the C2bp tool in the SLAM toolkit; see Ball et al., "Automatic Predicate Abstraction of C programs," *PLDI 01: Programming Language Design and Implementation*, 203-213 (2001) and Ball et al. "The SLAM Project: Debugging System Software Via Static Analysis," *POPL 02: Principles of programming Languages*, 1-3 (2002), which are incorporated herein by reference). The Boolean program 700 has one variable (lt, le, al, ah) for each observed predicate.

Statements in the Boolean program 700 conservatively update each Boolean variable to track the value of its corresponding predicate. The enforce statement in the Boolean program 700 has the effect of putting an assume statement (with the same expression as the enforce) before and after each statement. The expression in the enforce statement rules out the six infeasible states listed in the previous section.

Boolean programs contain parallel assignment statements. The first such assignment in the Boolean program 700 captures the effect of the statements before label L0 in the C program 600 (FIG. 6):

$lt,le,al,ah:=T,T,*,*;$

This assignment statement sets the values of variables lt and le to true because the C code before label L0 establishes the conditions n>2, lo==1, and hi==n-1, which implies that lo<hi. The variables al and ah are non-deterministically assigned true or false (*) since the initial values in the input array are unconstrained.

The while loop at label L0 constrains le to be true if control passes into the body of the loop, as le is the variable corresponding to the predicate (lo<=hi). The statement lo++; at label L3 (FIG. 6) translates to the parallel assignment statement in the Boolean program 700 shown in FIG. 7:

$lt,le,al:=ch(F,!lt),ch(lt,!lt||!le),*;$

The ch function is a built-in function of Boolean programs that returns true (T) if its first argument is true, false (F) if its first argument is false and second argument is true, and * (T or F) otherwise. This translation of lo++ shows that:

If the predicate (lo<hi) is false before the statement lo++ then this predicate is false afterwards (and there is no way for this statement to make the predicate lo<hi true).

If the predicate (lo<hi) is true before lo++ then the predicate (lo<=hi) is true after; otherwise, if (lo<hi) is false or (lo<=hi) is false before then (lo<=hi) is false after.

The predicate (a[lo]<=pivot) takes on an unknown value (*) as a result of the execution of lo++.

The assignment statement hi--; at label L6 (FIG. 6) is similarly translated. The effects of the call to the swap procedure at label L9 (FIG. 6) are captured by the assignment statement al,ah :=!ah,!al; because this call swaps the values of the elements a[lo] and a[hi].

3. Reachable States in the Boolean Abstraction

In this example, the model checker Bebop is used to compute the reachable states of the Boolean program 700. The reachable states of Boolean program 700 are shown in the table in FIG. 8. There is a row for each of the thirteen labels in the Boolean program 700 (L0 to LC) and a column for each of the ten possible valuations for the Boolean variables (lt, le, al and ah).

There are 49 reachable states in the Boolean program 700, denoted by the "x" marks in the table. This is much smaller than the total number of states, which is 130. Such sparseness is important because it rules out many states that shouldn't be covered with tests (because they are unreachable in the Boolean program 700, and thus in the C program 600 (FIG. 6)). Let us examine the reasons for this sparseness.

Consider the first four columns of the table. In each of these columns, the variable al (third bit position from left) is true. If al is true upon entry to the while loop at labels L2 to L4, then this loop iterates until al becomes false. This is why (with two exceptions) there is no state in which al is true after label L4 in the function. The exception is due to the swap procedure, which makes al true at labels LA and LB.

Now consider the next three columns (labeled TTFT, FTFT, and FFFT). In these states, the variable al is false and ah (fourth bit position from left) is true. In these states, the first inner while loop does not iterate and the second inner while loop (labels L5 to L7) will iterate until ah is false.

Finally, at the columns labeled TTFF, FFFF, and FFTT, due to the effect of the two inner while loops, the label L8 can only be reached in one of two states (TTFF or FFFF), as can be seen in the table in FIG. 8. In the first case, the swap procedure will be called; in the second case, the swap procedure will not be called. The state FFTT is not reachable at all.

In summary, the reachable state space is sparse because of correlations between predicates in the code. This sparseness makes symbolic model checking efficient. Additionally, symbolic model checking of Boolean programs has a number of advantages over directly symbolically executing a C program: (1) it can compute loop invariants over the observed predicates; (2) it is more efficient since it only observes certain aspects of the program's state. The next section explains how the state space of the Boolean program 700 can be used to effectively guide symbolic execution of the C code 600 to generate test data.

4. Feasibility Testing and Input Generation

In testing, it is desirable to generate test inputs that will cause each observed reachable state (e.g., the reachable observable states indicated in FIG. 8) to be observed in an actual run of the concrete program.

Figure 9:
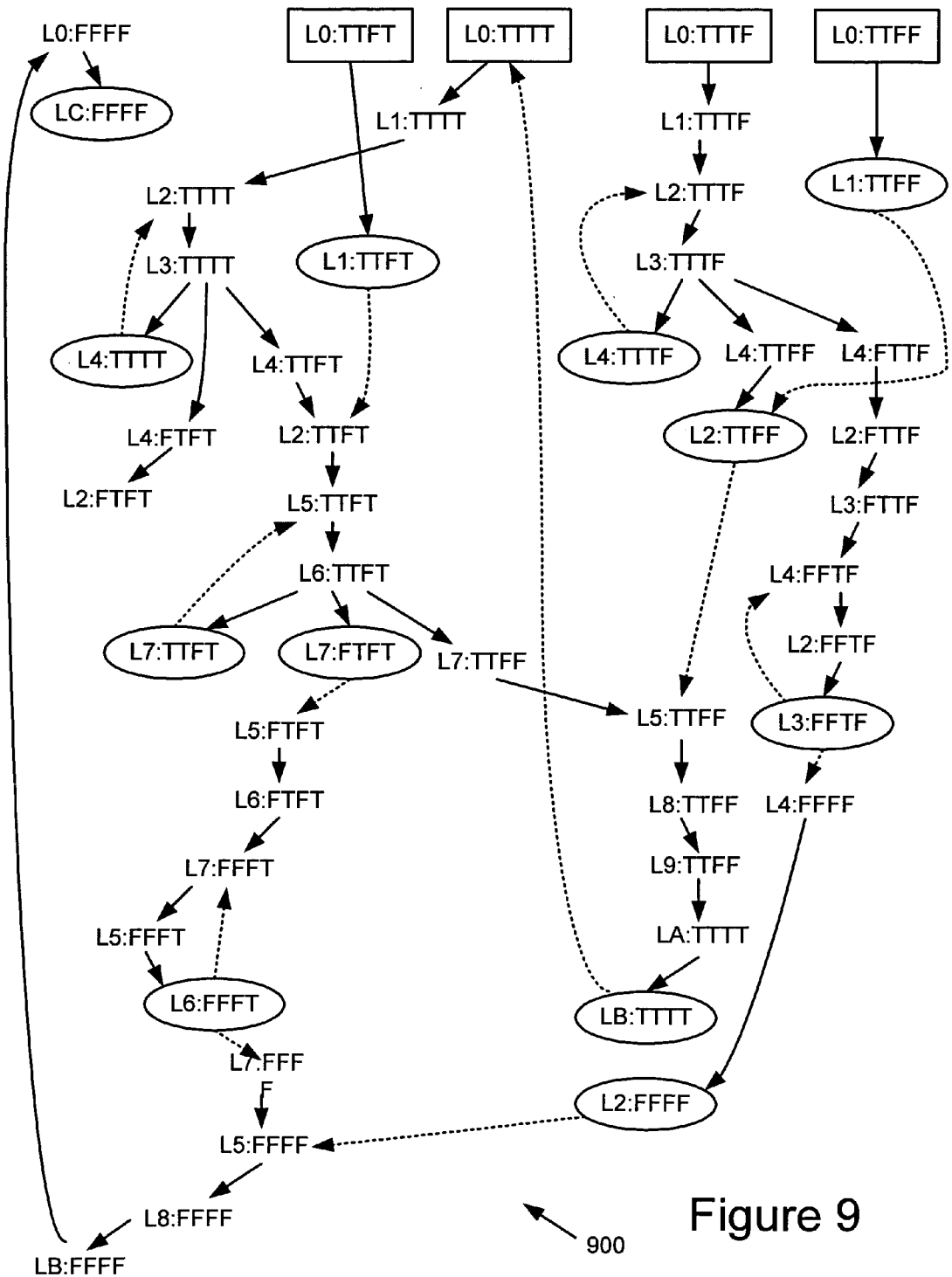
FIG. 9 is a graph depicting the reachable state space of the Boolean program of FIG. 7.

FIG. 9 depicts the reachable state space of the Boolean program 700 graphically. Each state is labeled LX:ABCD, where LX is the label (program counter), and A, B, C and D are the values of the Boolean variables lt, le, al, and ah. Edges represent state transitions. In FIG. 9, the solid edges in the graph are tree edges in a depth-first search (DFS) forest of the graph computed from the set of initial states {L0:TTFT, L0:TTTT, L0:TTTF, L0:TTFF} (represented as rectangles). The dotted edges are non-tree edges in the DFS forest. There are twelve leaves in the DFS forest (represented as ovals). To cover all the states in the DFS forest requires twelve unique paths (from a rectangle to an oval), which in this example are automatically generated as the output of the Bebop model checker.

Let us consider one of these paths: L0:TTTF→L1: TTTF→L2:TTTF→L3:TTTF→L4:TTFF→L2:TTFF and the program 1000 (FIG. 10) it induces. There are five transitions between labels in this path. The transition L0:TTTF→L1: TTTF corresponds to the expression in while loop at label L0 evaluating to true. This is modeled by the statement assume(lo<=hi) in the program 10 in FIG. 10. The five statements corresponding to the five transitions are presented after the "prelude" code in FIG. 4. The assert statement at the end of the program 1000 asserts that the final state at label L2 (TTFF) cannot occur.

In this example, CBMC, a bounded-model checker for C programs, is used to determine whether or not the assert statement in the generated program 1000 can fail. See Clarke et al, "Behavioral Consistency of C and Verilog Programs Using Bounded Model Checking," *Design Automation Conference*, 368-371 (2003).

If it can fail then it means that all the observed states in the path are reachable in the original C program 600 (FIG. 6) and CBMC generates a counterexample which includes an initial state that will cause the original C program to visit all these observed states. (CBMC unrolls a C program to a Boolean formula and uses a SAT solver to determine if the C program can fail and generate an input that would cause it to fail). If CBMC proves that the assert statement cannot fail then the path is infeasible. We will discuss later what can be done when infeasible paths are encountered.

For the generated program 1000 of FIG. 10, CBMC finds a counterexample and produces the input array {1, −7, 3, 0}. The partition function 600 run on this input will cover the six reachable states in the path L0:TTTF→L1:TTTF−L2: TTTF→L3:TTTF→L4:TTFF→L2:TTFF. Given the input array, the initial values of (lo, hi, pivot, a[lo], a[hi]) are (lo=1, hi=3, pivot=1, a[lo]=−7, a[hi]=0) just before execution of label L0. This covers the state L0:TTTF. Since lo<=hi in this state, control will pass to labels L1 and then L2, thus covering states L1:TTTF and L2:TTTF. Since a[lo]<=pivot in the current state, control will pass from L2 to L3, covering L3:TTTF.

At this point the increment of lo takes place and the values of the five locations now are (lo=2, hi=3, pivot=1, a[lo]=3, a[hi]=0). Control passes to label L4. The expression $$((lo<hi)\&\&(lo<=hi)\&\&!(a[lo]<=pivot)\&\&!(a[hi]>pivot))$$

evaluates to true and control passes back to L2. Thus, state L2:TTFF has been covered as well.

FIG. 11 shows the results of running the CBMC bounded model checker on each of the generated programs corresponding to the twelve paths to leaf vertices in the DFS forest shown in FIG. 9. In FIG. 11, if the column "CBMC result" contains "assert," CBMC found a counterexample that causes the final assert statement to fail. If the column contains "infeasible," CBMC proved that the final assert cannot fail. In this example, CBMC finds that eleven of the twelve paths generated from the Boolean program are feasible in the source program 600 (FIG. 6).

The infeasible path is due to the fact that the state L6:FFFT is not reachable in the C program 600, but is reachable in the Boolean program 700. The path is infeasible in the C program 600 because the hi variable has been decremented so that its value is less than that of the lo variable. Because the C code 600 maintains the invariant that all array elements with index less than lo have value less than or equal to pivot, the value of a[hi] must be less than or equal to pivot. However, the state L6:FFFT requires that a[hi]>pivot is true at the end of the path. The reason the path is feasible in the Boolean program 700 is that our four chosen predicates do not track the values of the array elements that are below the index lo or are above the index hi.

As shown in FIG. 11, three of the twelve feasible paths exhibit a bounds violation, namely those with leaf states L2:FFFF, L3:FFTF and L4:TTTF. For example, the path with leaf state L2:FFFF and the path with leaf state L3:FFTF both have the input array {0, −7, −8}, which will cause the partition function 600 to advance the lo index beyond the upper bound of the array. Two different paths can generate the same input array because the value of a[lo] is undefined when the variable lo steps beyond the bounds of the array {0, −7, −8 }. Thus, the predicate a[lo]<=pivot could be true or false, giving rise to two different paths.

5. Analysis of the Corrected Partition Function

The partition function 600 is modified to eliminate the two array bounds violations (first and second inner while loops) and the process is re-run on the modified function. The end result of this analysis is shown in FIG. 12. The results for ten of the leaf states (L1:TTFF, L1:TTFT, L2:FFFF, L2:TTFF, L4:TTTF, L4:TTTT, L7:FTFT, L7:TTFT, LB:TTTT, LC:FFFF) are exactly the same as before. The leaf states L3:FFTF and L6:FFFT, which were reachable in the buggy Boolean program 700, are no longer reachable in the fixed Boolean program. The first state corresponded to a bounds violation (which has been eliminated) and the second state was unreachable in the buggy C program 600. However, two new leaf states have been found: LC:FFFT and LC:FFTF.

C. Discussion

1. Predicate Selection

Our approach to test generation is parameterized by the set of predicates E, which define the precision of the Boolean abstraction BP(P,E). The more precise this abstraction, the more likely that the paths generated by the Bebop model checker ($P(S_E)$) will be feasible paths ($F(S_E)$) in the source program P. This gives rise to the ratio $|F(S_E)|/|P(S_E)|$, which measures the precision of the Boolean program abstraction by its ability to find feasible paths in the source program.

To illustrate this concept, consider using our test generation process on the partition function 600 (FIG. 6) with no predicates. In such a case, every path through the control-flow graph would be considered by the model checker, including many infeasible paths. For example, the model checker would output the (infeasible) path in which the outermost while loop does not iterate. However, in the source program 600, the outermost while loop must iterate at least once.

What exactly does a $|F(S_E)|/|P(S_E)|$ ratio of 1.0 signify? It says that no more tests are needed in order to cover the observable states in $S_E$. However, it doesn't mean that all interesting observations about a piece of code have been made. In our running example, the specification for the partition function 600 illustrates other observations that can be made. This specification states that at label L1 the following loop invariant holds:

for all $i$, $0<=i<lo$, $a[i]<=$pivot and for all $j$, $hi<j<n$, pivot$<a[j]$

Generating test data based solely on the code is generally not sufficient—one should also consider the specification of what the code is supposed to do.

If a path in $p_s$ generated by the model checker is infeasible in the C program, it may be that the state s at the end of $p_s$ is unreachable in the C program or it may be that there is a feasible path to s but the predicates in E were insufficient to guide the model checker to this path. In this case, there are several alternatives: e.g., involve the programmer in the process to either add predicates to E to guide the model checker to a feasible path to s or assert that the state is not reachable; or use an automated tool such as SLAM to try to prove that s is reachable/unreachable in the C program, thereby generating more predicates.

2. The Small Scope Hypothesis

The "small scope hypothesis" of testing is that a high percentage of the bugs in a system can be found by exhaustively checking the program on inputs of a small size. Given this hypothesis, a central question is "how large should 'small' be?" Techniques in this example help to generate such small inputs that cover a set of observed states. In this example, the size of the input arrays range from length three to six. The observations E place constraints on the size of the input needed to cover the observable states $S_E$. In effect, this process can help determine how large "small" should be.

3. Example Implementation

This approach can be implemented, for example, for Microsoft's intermediate language (MSIL)—a bytecode representation now targeted by Microsoft compilers for C# and Visual Basic. A unit testing tool can be created that will automate test generation for MSIL or for some other language.

IV. A Second Combined Implementation of Described Techniques and Tools

The following example describes a new form of control-flow coverage that is based on observing the vector consisting of a program's conditional predicates, thus creating a finite-state space. The features and limitations described in this example vary in other implementations.

Consider a program with m statements and n predicates, where the predicates are derived from the conditional statements and assertions in a program, as well as from implicit run-time safety checks. An observable state is an evaluation of the n predicates under some state at a program statement.

Predicate-complete testing (PCT) seeks to cover every reachable observable state (at most ($m \times 2^n$) of them) in a program. PCT coverage is a new form of coverage motivated by the observation that certain errors in a program only can be exposed by considering the complex dependences between the predicates in a program and the statements whose execution they control. PCT coverage subsumes many existing control-flow coverage criteria and is incomparable to path coverage.

To support the generation of tests to achieve high PCT coverage, an upper bound U and lower bound L to the (unknown) set of reachable observable states R is defined. These bounds are constructed automatically using Boolean (predicate) abstraction over modal transition systems and can be used to guide test generation via symbolic execution. A static coverage metric is defined as $|L|/|U|$, which measures the ability of the Boolean abstraction to achieve high PCT coverage. Finally, a technique for increasing this ratio by the addition of new predicates is described.

A. Introduction

Control-flow-based test generation generally seeks to cover all the statements or branches in a program. There are various control-flow adequacy criteria that go beyond branch coverage, such as multiple condition coverage and path coverage. Paths are notoriously difficult to work with as a coverage metric because there are an unbounded number of them in programs with loops, which characterizes most interesting programs in existence. However, there is a growing realization that many errors that go undetected in the face of 100% statement or branch coverage are due to complex correlations between the predicates (that control the execution of statements) and the statements (that affect the value of these predicates) of a program.

An alternative to path coverage that induces a finite (rather than infinite) state space is therefore desirable. A fixed notation for atomic predicates (not containing Boolean connectives) is taken from the relevant programming language. Consider a program with m statements and n predicates. An observable state is an evaluation of the n predicates under some program state at a statement. While the set of states in a program is unbounded, the size of the set of observable states (S) is at most (m×$2^n$).

PCT testing seeks to cover all reachable observable states. The n predicates represent all the case-splits on the input that the programmer identified. (Of course, the programmer may have missed certain cases—specification-based testing can be used to determine the absence of such case-splits.) In the limit, each of the m statements may have different behavior in each of the $2^n$ possible observable states, and so should be tested in each of these states. PCT coverage subsumes traditional coverage metrics such as statement, branch and multiple condition coverage and is incomparable to path coverage. PCT groups paths ending at a statement s into equivalence classes based on the observable states they induce at s.

Control-flow coverage metrics result from dividing a dynamic measure (for example, the number of statements executed by a test) into a static measure (for example, the number of statements in a program). Clearly, such a metric also can be defined for observable states. However, the choice of (m×$2^n$) as a denominator will not do, since many of the (m×$2^n$) states may be unreachable. (Statement coverage does not suffer greatly from this problem because most statements are reachable). For example, if the set of predicates contains (x=0) and (x=1) then not all combinations are possible. Furthermore, invariants established by the program will further cut down the number of reachable observable states.

Thus, to define a better denominator for PCT coverage, a technique using over-approximation and under-approximation of the set of reachable observable states (R) using the theory of modal transition systems and Boolean abstraction is described. The Boolean abstraction of a program with respect to its n predicates is a non-deterministic program, whereas the original concrete program is deterministic. In this exemplary implementation, reachability analysis of this abstract program yields an upper bound U for R ($R \subseteq U$) as well as a lower bound L for R ($L \subseteq R$). The set U is an over-approximation of R: any state outside U is not a reachable observable state and need not (indeed, cannot) be tested. This set U provides a better denominator than (m×$2^n$). Conversely, the set L is an under-approximation of R: any state in L must be a reachable observable state. States in L must be testable.

The reachability status of states in U-L is unknown. If a set of tests doesn't cover some states in L, one should first try to cover these states. L can be used to guide symbolic path-based test generation to cover the untested states in L. After covering L, the (static) ratio |L|/|U| can be brought closer to one by refining the Boolean abstraction through the introduction of additional predicates.

B. A Characterization of Predicate-complete Test Coverage

This section compares PCT coverage with other forms of control-flow coverage. In this comparison, complex predicates are decomposed into atomic predicates. So, the program fragment L1: if ((x<0)||(y<0)) S else T contains two branches corresponding to the atomic predicates (x<0) and (y<0). Based on this decomposition, the concepts of branches, atomic predicates and conditions are equivalent.

Complete PCT coverage means that each reachable observable state of a program is covered by a test. This implies that each (executable) statement is executed at least once, so PCT subsumes statement coverage. PCT coverage requires that each predicate be tested so as to evaluate to both true and false (of course this may not be possible for unsatisfiable predicates such as (x!=x)), so it subsumes branch coverage. PCT clearly also subsumes multiple condition coverage and its variants. Considering the program fragment given above, multiple condition coverage requires every possible Boolean combination of (x<0) and (y<0) to be tested at L1, which seems similar to PCT. But now, consider the sequencing of two if statements:

L2: if (A||B) S else T

L3: if (C||D) U else V

PCT requires that every Boolean combination over the set {A, B, C, D} be tested at every statement in the program (six in this case, the two if statements and the four statements S, T, U and V). Multiple condition coverage only requires that every Boolean combination over {A, B} be tested at L2 and that every that every Boolean combination over {C, D} be tested at L3. Similarly, predicate-based test generation focuses on testing predicates in a program. See, e.g., Tai, "Theory of Fault-based Predicate Testing for Computer Programs, *IEEE Trans. on Software Engineering*, 22(8):552-562 (1996); Tai, "Predicate-based Test Generation for Computer Programs," *ICSE 03: Int'l Conf on Software Engineering*, 267-276 (2003). It considers correlations between predicates that appear in a single conditional statement but does not consider correlations between predicates that appear in different conditional statements, as does PCT.

Of course, paths can be viewed as possible logical combinations of predicates, so it is natural to ask how PCT relates to path coverage. Since a program with n predicates can have at most $2^n$ paths, it seems like PCT might have the ability to explore more behaviors (as it may explore (m×$2^n$) states in the limit). In fact, PCT and path coverage are incomparable, even for loop-free programs.

The code listing 1300 in FIG. 13 shows that it is possible to cover all reachable observable states in a (loop-free) program without covering all feasible paths. Assume that the uninitialized variable x can take on any initial (integer) value. The reachable observable states of this program are shown in the comments to the right of the program. The set of tests {x→−1, x→1} covers all these states. The test {x→−1} covers the observable states {(L1, x<0), (L2, x<0), (L4, x<0), (L5,!(x<0))} via the path (L1,L2,L4,L5), while the test {x→1} covers the observable states

{(L1,!(x<0)), (L3,!(x<0)), (L4, x<0), (L5, x<0), (L6, x<0)} via the path (L1,L3,L4,L5,L6). However, this set of tests does not cover the feasible path (L1,L2,L4,L5,L6), which is covered by the test {x→−2}.

Because of the assignment statement "x=−2;", the set of reachable observable states at label L4 (namely (L4,x<0)) cannot distinguish whether the executed path to L4 traversed the then or else branch of the initial if statement. While PCT can track many correlations, assignment statements such as the one above can cause PCT to lose track of correlations captured by path coverage.

In this example, if the predicate (x==−2) is added to the set of observed predicates then PCT coverage is equivalent to path coverage, as PCT coverage will require the test {x→ −2 } in order to cover the reachable state (L2,x==−2).

The following code sample shows it is possible to cover all feasible paths in a (loop-free) program without covering all reachable observable states:

L1: if(p)

L2: if (q)

L3: x=0;

L4: A;

The program has three feasible paths: (L1,L2,L3,L4), (L1, L2,L4) and (L1,L4). However, a test set of size three that covers these paths clearly will miss either the observable state (L4,!p&&q) or (L4,!p&&!q).

In summary, PCT coverage is a new type of coverage criteria that subsumes statement, branch, multiple condition and predicate coverage. PCT has similarities to path coverage but is strictly incomparable, as the above examples demonstrate.

C Analysis of an Example Function

This section demonstrates upper and lower bounds to the reachable observable states of the partition function 600 (FIG. 6). There is an array bound check missing in the code that can lead to an array bounds error: the check at the while loop at label L2 should be (lo<=hi && a[lo]<=pivot). This error only can be uncovered by executing the statement lo++ at label L3 at least twice.

There are thirteen labels in the partition function 600 (L0-LC), but an unbounded number of paths. Instead of reasoning in terms of paths, predicates are used to observe the states of the partition function 600. Let us observe the four predicates that appear in the conditional guards of the function: (lo<hi), (lo<=hi), (a[lo]<=pivot), and (a[hi]>pivot). An observed state thus is a bit vector of length four (lt; le; al; ah), where lt corresponds to (lo<hi), le corresponds to (lo<=hi), al corresponds to (a[lo]<=pivot), and ah corresponds to (a[hi]>pivot).

There only are ten feasible valuations for this vector, as six are infeasible because of correlations between the predicates:

If !(lo<hi)&&(lo<=hi) then (lo==hi) and so exactly one of the predicates in the set {(a[lo]<=pivot), (a[hi]>pivot)} must be true. Thus, the two valuations FTFF and FTTT are infeasible.

Since (lo<hi) implies (lo<=hi), the four valuations TFFF, TFTT, TFFT and TETF are infeasible.

These correlations reduce the possible observable state space from 13*16 =208 to 13*10 =130.

1. Boolean Abstraction

FIG. 14 shows another Boolean abstraction of the partition function 600 (FIG. 6) with respect to the four observed predicates, encoded as a Boolean program 1400. Boolean program 1400 has one variable (lt, le, al, ah) corresponding to each predicate. Statements in the Boolean program 1400 conservatively update each Boolean variable to track the value of its corresponding predicate. The enforce statement is a global assumption that rules out the six infeasible valuations mentioned above.

As explained in Section III, the assignment statement lt,le, al,ah:=T,T,*,*; sets the values of variables lt and le to true because the C code before label L0 establishes the conditions n>2, lo==1, and hi==n−1, which implies that lo<hi. The variables al and ah are non-deterministically assigned true or false (*) since the initial values in the input array are unconstrained.

The while loop at label L0 constrains le to be true if control passes into the body of the loop, as le is the variable corresponding to the predicate (lo<=hi). The statement lo++; at label L3 translates to the parallel assignment statement in the Boolean program 1400:

lt,le,al:=(!lt?F:*), lt,*;

This translation of lo++ shows that:

if the predicate (lo<hi) is false before the statement lo++ then this predicate is false afterwards; otherwise, the predicate takes on an unknown value (*);

if the predicate (lo<hi) is true before lo++ then the predicate (lo<=hi) is true after; otherwise, if (lo<hi) is false before then (lo<=hi) is false after.

the predicate (a[lo]<=pivot) takes on an unknown value (*) as result of the execution of lo++.

The assignment statement hi−−; at label L6 (FIG. 6) is similarly translated. The effects of the call to the swap procedure at label L9 (FIG. 6) are captured by the assignment statement al,ah :=!ah,!al; because this call swaps the values of the elements a[lo] and a[hi].

The Boolean program 1400 shown in FIG. 14 is an abstraction of the C program in the following sense: any state transition c→c' in the C program is matched by a corresponding transition a→a' in the Boolean program, where a is the abstract state corresponding to c and a' is the abstract state corresponding to c'. However, there may be state transitions in the Boolean program 1400 that are not matched by transitions in the C program. In this sense, the Boolean program 1400 has more behaviors than the C program (the Boolean program over-approximates the behaviors of the C program).

2. Upper and Lower Bounds

FIG. 8 shows the reachable states of the Boolean program 1400 (computed using the Bebop model checker). (The reachable states of the Boolean program 1400 are the same as the reachable states for the Boolean program 700 (FIG. 7)). There are 49 reachable states in the Boolean program 1400, denoted by the "x" marks in the table. These 49 states represent the upper bound U to the set of reachable observable states in the partition function 600 (FIG. 6). States outside U cannot be tested because they are unreachable in the Boolean program 1400, and thus in the partition function 600.

Figure 15:
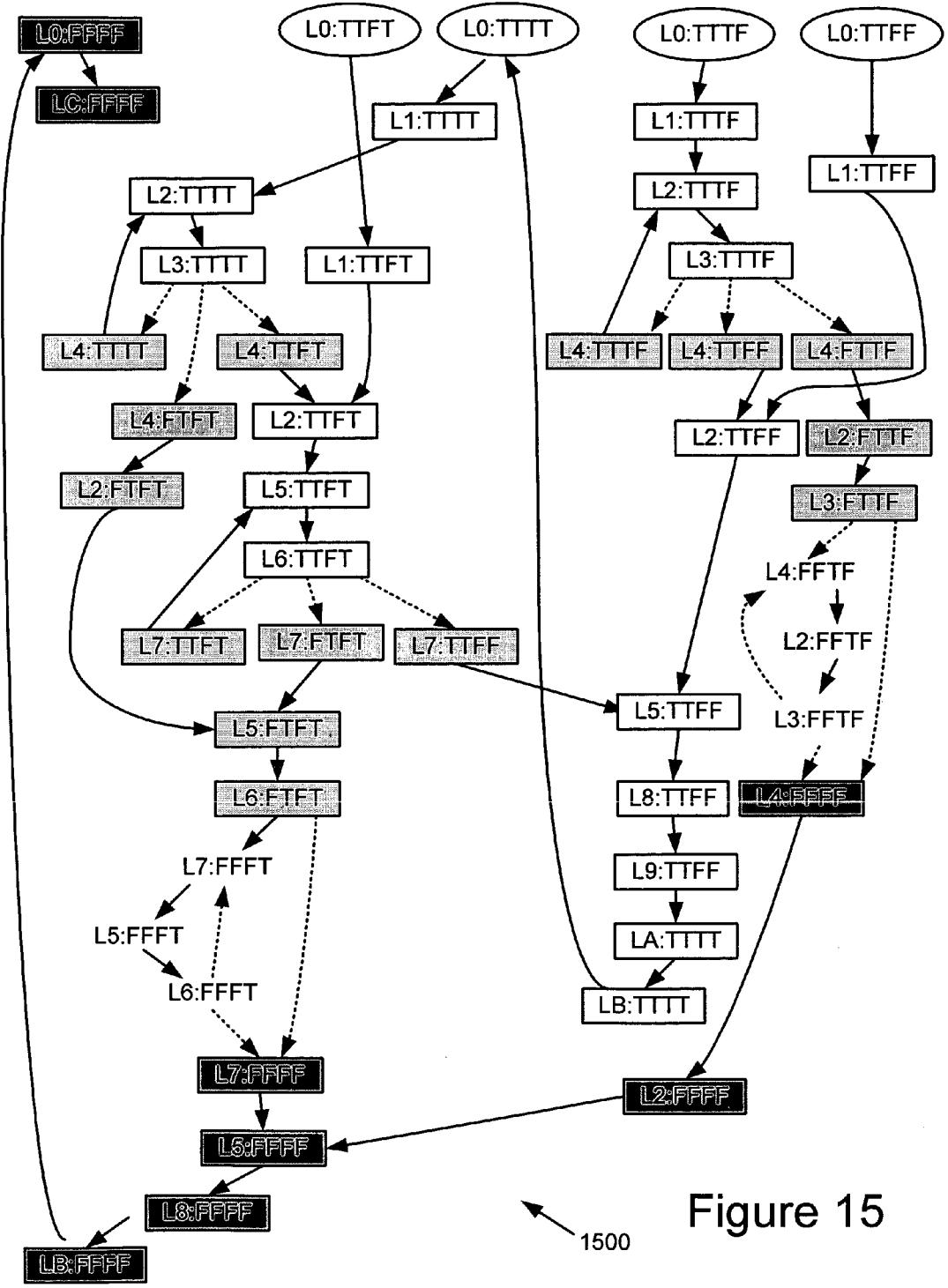
FIG. 15 is a graph depicting the reachable state space of the Boolean program of FIG. 14.

FIG. 15 shows the reachable state space of the Boolean program 1400 as a graph 1500. Each of the 49 states is uniquely labeled LX:ABCD, where LX is the label (program counter), and A, B, C and D are the values of the Boolean variables lt, le, al, and ah. In FIG. 15, the four initial states L0:TTFT, L0:TTTT, L0:TTTF, and L0:TTFF are denoted by ovals. Each edge in the graph 1500 represents a transition between two reachable states of the Boolean program 1400. Informally, a solid edge represents a transition that must occur in the partition function 600 (FIG. 6), while a dotted edge represents a transition that may occur in the partition function. These transitions are formally defined below.

Consider the initial state L0:TTTT. This abstract state corresponds to all concrete states that satisfy the expression:

(lo<hi)&&(a[lo]<=pivot)&&(a[hi]>pivot)

States satisfying this condition will cause the body of the outer while loop (label L1) and the body of the first inner while loop (label L3) to execute. This is reflected in the state space by the sequence of must-transitions L0:TTTT→L1: TTTT→L2:TTTT→L3:TTTT.

The set of nodes in FIG. 15 represent the states that comprise the upper bound U (|U|=49). The ellipses and rectangles comprise the lower bound L (|L|=43). The nodes rendered in plaintext represent those states that are in U−L. The exact reachability status of the concrete states corresponding to these abstract states is in question.

In summary, the ratio |L|/|U| measures the ability of the abstraction to guide test generation to cover the observable states of a program. In this example, the ratio is 43/49. If the ratio were 1.0, then we have precisely characterized the set of reachable observable states. Abstraction refinement can be used to increase the ratio |L|/|U|. As described below, it is possible to reach a ratio of 1.0 for the partition function 600 through the addition of three predicates.

D. Formalizing Abstraction

In this section, the concepts of concrete and abstract transition systems are defined that we will be used to compute the upper and lower bounds, U and L, to the set of reachable observable states R of a program.

1. Concrete Transition Systems

A deterministic sequential program is represented by a concrete transition system (CTS) as follows:

Definition 4.1: (Concrete Transition System). A concrete transition system is a triple $(S_C; I_C; \rightarrow)$ where $S_C$ and $I_C$ are non-empty sets of states and $\rightarrow \subseteq S_C \times S_C$ is a transition relation satisfying the following constraints:

$S_C = \{halt, error\} \cup T_C$;
$I_C \subseteq T_C$ is the set of initial states;
$\forall s_c \in T_C, |\{s'_c \in S_C | s_c \rightarrow s'_c\}| = 1$ There are two distinguished end states, halt and error, which correspond to execution terminating normally and going wrong, respectively. These two states have no successor states. All other states have exactly one successor. Thus, a CTS models a program as a set of traces.

2. Abstract Transition Systems

Modal Transition Systems (MTSs) are a formalism for reasoning about partially defined systems that can be used to model (Boolean) abstractions of CTSs. See, e.g. Godefroid et al., "On the Expressiveness of 3-valued Models," *VMCAI 03: Verification, Model Checking and Abstract Interpretation*, 206-222 (2003); Godefroid, "Reasoning About Abstract Open Systems with Generalized Module Checking," *EMSOFT 03: Conf on Embedded Software*, 223-240 (2003). Modal transition systems can be generalized to tri-modal transition systems (TTSs) as follows:

Definition 4.2: (Tri-Modal Transition System). A TTS is a tuple $$(S, \xrightarrow{may}, \xrightarrow{must+}, \xrightarrow{must-})$$

where S is a nonempty set of states and $$\xrightarrow{may} \subseteq S \times S, \xrightarrow{must+} \subseteq S \times S, \text{ and } \xrightarrow{must-} \subseteq S \times S$$

are transition relations such that $$\xrightarrow{must+} \subseteq \xrightarrow{may} \text{ and } \xrightarrow{must-} \subseteq \xrightarrow{may}.$$

A "total-onto" relation over D×E contains at least one pair (d, e), e ∈ E, for each element d ∈ D (it is total) and at least one pair (d', e'), d' ∈ D, for each element e' ∈ E' (it is onto). A total-onto abstraction relation induces an abstract TTS $M_A$ from a CTS $M_C$ as follows:

Definition 4.3: (Precise Abstraction Construction). Let $M_C = (S_C, I_C, \rightarrow)$ be a CTS. Let $S_A$ be a set of abstract states and ρ be a total-onto abstraction relation over pairs of states in $S_C \times S_A$. Let match+ and match− relate states in $S_C \times S_A$ as follows:

$$\text{match+}(S_c, S'_a) = \exists (S'_c, S'_a) \in \rho : S_c \rightarrow S'_c$$

$$\text{match−}(S'_c, S_a) = \exists (S_c, S_a) \in \rho : S_c \rightarrow S'_c$$

$$A\ TTS\ M_A = (S_A, \xrightarrow{may}_A, \xrightarrow{must+}_A, \xrightarrow{must-}_A)$$

is constructed from $M_C$, $S_A$ and ρ as follows:

(a) $s_a \xrightarrow{may}_A s'_a$ iff $\exists (s_c, s_a) \in \rho$: match+$(s_c, s'_a)$;

(b) $s_a \xrightarrow{must+}_A s'_a$ iff $\forall (s_c, s_a) \in \rho$: match+$(s_c, s'_a)$;

(c) $s_a \xrightarrow{must-}_A s'_a$ iff $\forall (s'_c, s'_a) \in \rho$: match−$(s'_c, s_a)$.

It is easy to see that the definition of $M_A$ satisfies the constraints of a TTS, namely that $$\xrightarrow{must+}_A \subseteq \xrightarrow{may}_A \text{ and } \xrightarrow{must-}_A \subseteq \xrightarrow{may}_A.$$

The if-and-only-if ("iff") notation indicates the assumption that it is possible to create a most precise abstract TTS $M_A$ from a given CTS $M_C$. In general, this assumption does not hold for infinite-state $M_C$. It does hold for the partition function and other code examples we consider here.

Figure 16A:
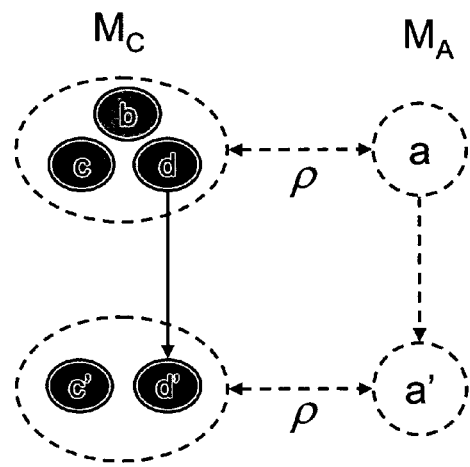
FIGS. 16A-16D are graphs illustrating must and may transitions.

FIGS. 16A-16D illustrate the three types of transitions in a TTS $M_A$ constructed from a CTS $M_C$ via the above definition. In FIGS. 16A-16D, the grey nodes represent states in $S_C$ and edges between these nodes represent transitions in →. The dotted ovals around the nodes represent an abstract state that these concrete states map to under the abstraction relation ρ.:

FIG. 16A shows a transition $$a \xrightarrow{may}_A a'.$$

May-transitions are depicted as dashed edges. This transition exists because concrete state d maps to a (under ρ) and transitions to d' via d→d', where d' maps to a'. Thus, match+(d, a') holds. Note, however that match+(c, a') does not hold, nor does match−(c', a). Therefore, in this case, there is no transition $$a \xrightarrow{must+}_A a' \text{ or } a \xrightarrow{must-}_A a'.$$

Figure 16B:
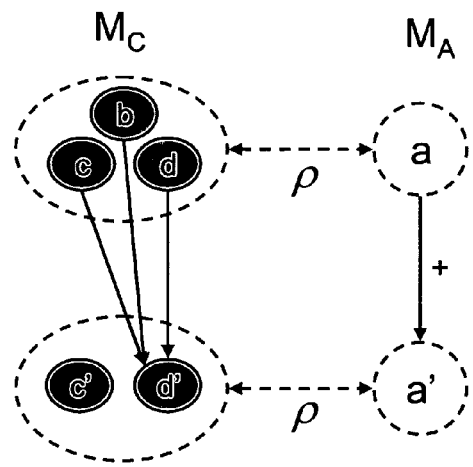

FIG. 16B shows a transition $$a \xrightarrow{must+}_A a'$$

depicted as a solid edge with a "+" label. This transition exists because for all states x ∈{b, c, d} (mapping to a under ρ), match+(x, a') holds. This is due to the existence of the transitions b→d', c→d' and d→d'. That is, must+ transitions identify a total relation between sets of concrete states corresponding to a and a'. Note that match−(c', a) does not hold, so there is no transition $$a \xrightarrow{must-}_A a'.$$

Figure 16C:
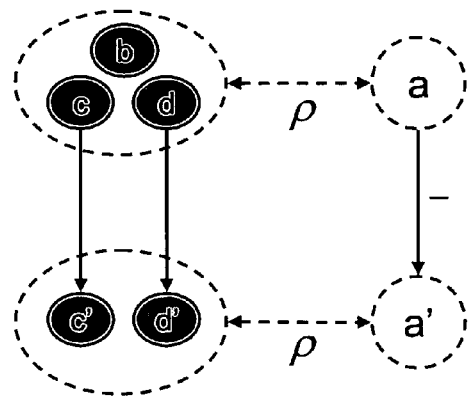

FIG. 16C shows a transition $$a \xrightarrow{must-}_A a',$$

which exists because for all states x' ∈{c', d'} (mapping to a' under ρ), match−(x', a) holds. That is, must− transitions identify an onto relation between sets of concrete states corresponding to a and a'. These transitions are depicted as solid edges with a "−" label.

Figure 16D:
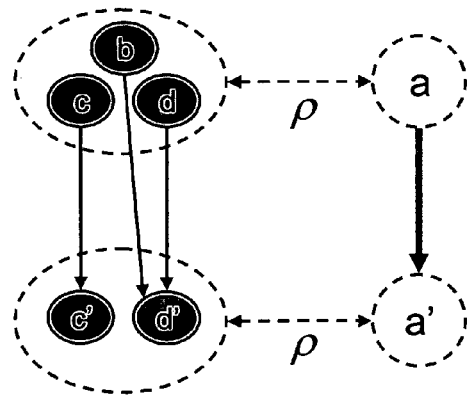

FIG. 16D shows the case in which there are both transitions $$a \xrightarrow{must+}_A a'$$

and a $$a \xrightarrow{must-}_A a'. \text{ Let } a \xrightarrow{must\#}_A a'$$

denote the fact that $$a \xrightarrow{must+}_A a' \text{ and } a \xrightarrow{must-}_A a'.$$

These transitions are depicted as bold edges.
In FIG. 15, only $$\xrightarrow{must\#}_A$$

transitions (solid line edges) and may-transitions (dotted edges) are present.

3. Predicate Abstraction

Predicate abstraction maps a (potentially infinite-state) CTS into a finite-state TTS defined by a finite set of quantifier-free formulas of first-order logic $\Phi=\{\phi_1, \ldots, \phi_n\}$. A bit vector b of length n ($b=b_1 \ldots b_n, b_i \in \{0, 1\}$) defines an abstract state whose corresponding concrete states are those satisfying the conjunction $(b,\Phi)=(l_1\hat{~} \ldots \hat{~} l_n)$ where $l_i = \phi_i$ if $b_i=1$ and $l_i = \neg \phi_n$ if $b_i=0$. s⊨(b,Φ) denotes that (b, φ) holds in state s.

Definition 4.4: (Predicate Abstraction of a CTS). Given a CTS $M_C=(S_C, I_C, \rightarrow)$ and a set of predicates $\Phi=\{\phi_1, \ldots, \phi_n\}$, predicate abstraction defines the total-onto abstraction relation ρ and the set of abstract states $S_A$:
$$\rho \in (S_C, \{0, 1\}^n), \text{ where } (s; b) \in \rho \Leftrightarrow s\models(b, \Phi)$$
$$S_A = \{b \in \{0, 1\}^n | \exists (s; b) \in \rho\}$$
which define the finite-state abstract $$TTS \; M_A = (S_A, \xrightarrow{may}_A, \xrightarrow{must+}_A, \xrightarrow{must-}_A)$$

(per Definition 4.3). Assume that $S_A$ contains abstract states $halt_A$ and $error_A$ that are in a one-to-one relationship with their counterparts halt and error from $S_C$.

Algorithms for computing the may and must+ transitions of a predicate abstraction of an MTS are given by Godefroid, Huth and Jagadeesan. See Godefroid et al., "Abstraction-based Model Checking Using Modal Transition Systems," *CONCUR 01: Conf. on Concurrency Theory*, 426-440 (2001). Computation of the must− transitions can be done in a similar fashion. Computation of the most precise abstract transitions is undecidable (neither formally provable nor unprovable), in general. Assume here the existence of a complete theorem prover that permits the computation of the most precise abstract transitions.

Let WP(s, e) be the weakest pre-condition of a statement s with respect to expression e and let SP(s, e) be the strongest post-condition of s with respect to e. See Gries, *The Science of Programming*, Springer-Verlag (1981). (For any state c, satisfying WP(s, e) the execution of s from $c_1$ results in a state $c_2$ satisfying e. For any state $c_1$ satisfying e the execution of s from $c_1$ results in a state $c_2$ satisfying SP(s, e)). Let $P_1$ and $P_2$ be the concretization of two bit vectors $b_1$ and $b_2$ (i.e., $P_1=(b_1, \Phi>)$ and $P_2=<(b_2, \Phi<)$. Statement s induces a may-transition from $b_1$ to $b_2$ if $\exists V: P_1 \hat{~} WP(s, P_2)$, where V is the set of free variables in the quantified expression. Statement s induces a must+ transition from $b_1$ to $b_2$ if $\forall V.P_2 \Rightarrow SP(s, P_1)$.

In order to show relations between the reachable states of $M_A$ and $M_C$, it is useful to define a concretization function γ mapping states in $S_A$ to states in $S_C$:

Definition 4.5: (Concretization Function). Let $\rho:S_C \times S_A$ be an abstraction relation. Let $$\gamma_\rho(A) = \{S_c | \exists S_a \in A: (S_c, S_a) \in \rho\}$$

be the concretization function mapping a set of abstract states to its corresponding set of concrete states.

Using this function, the set of initial abstract states $I_A$ of $M_A$ is defined as the set satisfying the formula $$I_C = \gamma_\rho(I_A)$$

When ρ is understood from context we will use γ rather than $\gamma_\rho$.

4. EXAMPLE

Figures 17, 18:
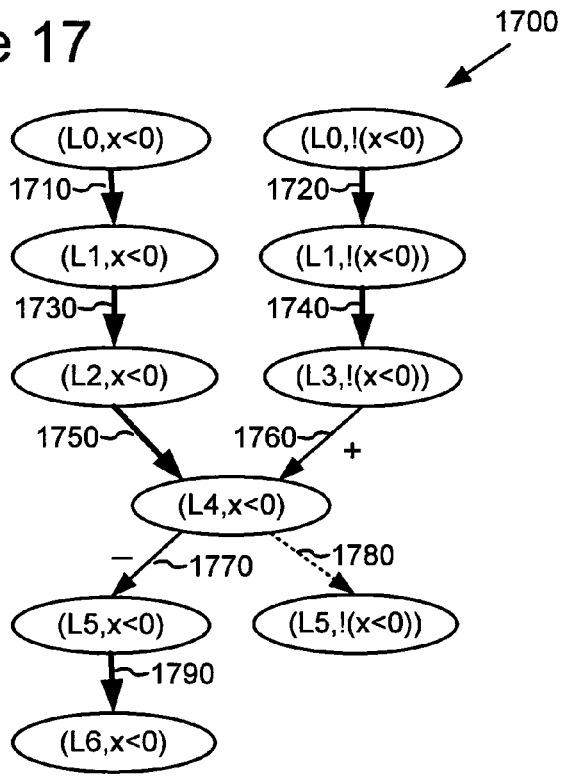
FIG. 17 is a graph showing a set of reachable abstract transitions for the program of FIG. 13.
FIG. 18 is a table showing results of test generation on programs corresponding to ten paths uniquely identified by beginning and ending vertices in FIG. 15.

FIG. 17 is a graph 1700 showing a set of (reachable) abstract transitions for the program 1300 from FIG. 13. Consider the statements in the program and the abstract transitions that they induce. In program 1300, the assignment statement at L0 is "y=0". We have that SP(y=0, (x<0))=WP(y=0, (x<0))=(x<0). Therefore, we have a must# transition $$(L0, x < 0) \xrightarrow{must\#} (L1, x < 0)$$

(bold edge 1710 in graph 1700). For similar reasons, we have the must# transition $$(L0, !(x<0)) \xrightarrow{must\#} (L1, !(x<0))$$

(L1, !(x<0))(bold edge 1720).

The next statement in program 1300 is the if-statement at label L1. Because this statement branches exactly on the predicate (x<0), it induces the following must# transitions, indicated by bold edges 1730 and 1740, respectively:

$$(L1, x<0) \xrightarrow{must\#} (L2, x<0)$$

$$(L1, !(x<0)) \xrightarrow{must\#} (L3, !(x<0))$$

The statement at label L2 in program 1300 is a skip and so has no affect on the state, inducing the transition $$(L2, x<0) \xrightarrow{must\#} (L4, x<0)$$

(bold edge 1750).

The assignment statement at label L3 in program 1300 is reachable only when ! (x<0) is true. It assigns the value −2 to variable x. We have that WP(x=−2, (x<0))=(−2<0), which reduces to true. This means that there is a must+ transition $$(L3, !(x<0)) \xrightarrow{must+} (L4, (x<0))$$

(solid edge 1760 marked with a "+" symbol). However, WP(x=−2, !(x<0))=(!(−2<0)), which reduces to false. So there can be no transition from (L3, !(x<0)) to (L4, !(x<0)). Now, consider strongest post-conditions. We have that SP(x=−2, !(x<0))=!(−2<0), which reduces to false, so there can be no must− transition from (L3, !(x<0)) to (L4, (x<0)).

Now consider the assignment statement at label L4 in program 1300 which is reachable only under (x<0) and which increments variable x. Because SP(x=x+1, (x<0))=(x<1) and the set of states satisfying (x<0) is a subset of the set of states satisfying (x<1), there is a must− transition $$(L4, x<0) \xrightarrow{must-} (L5, x<0)$$

(solid edge 1770 marked with a "−" symbol). There is no must+ transition between these states because WP(x=x+1, (x<0))=(x<−1)) and the set of states satisfying (x<0) is not a subset of the set of states satisfying (x<−1). The assignment statement induces a may transition $$(L4, x<0) \xrightarrow{may} (L5, !(x<0))$$

(dotted edge 1780) because this transition only takes place when variable x has the value −1 before the increment and the (resulting) value 0 after the increment.

Finally, there is a must# transition $$(L5, x<0) \xrightarrow{must\#} (L6, x<0)$$

(bold edge 1790) because the if-statement at label L5 tests exactly the condition (x<0).

E. Defining Predicate-Complete Test Coverage

Recall that the goal of predicate-complete testing (PCT) is to cover reachable states, as defined by the m statements and n predicates $\Phi = \{\phi_1, \ldots, \}$ in the program represented by the CTS $M_C$. The set of reachable observable states R is unknown, so the Boolean (predicate) abstraction of $M_C$ will be used with respect to $\Phi$ to construct an abstract TTS $M_A$ (see Definition 4.4).

In this section, $M_A$ is analyzed to compute both upper and lower bounds to R. To do so, it useful to define a reachability function for a transition system. Let S be a set of states and $\delta$ be a transition relation of type S×S. The reachability function over $\delta$ and $X \subseteq S$ is defined as the least fixpoint of:

$$reach[\delta](X) = X \cup reach[\delta](\delta(X))$$

where $\delta(X)$ is the image of set X under $\delta$.

Reachability in a CTS: Let $M_C$ be a CTS. The set of states reachable from states in T ($T \subseteq S_C$) is denoted as:

$$reach_C(T) = reach[\rightarrow](T)$$

That is, reachability in $M_C$ is simply defined as the transitive closure over the transitions in $M_C$, starting from states in T.

1. Upper Bound Computation

May-reachability in TTS $M_A$ defines the upper bound U. Let $M_C$ be a CTS and let $M_A$ be an abstract TTS defined by abstraction relation $\rho$ (via Definition 4.3). The upper bound is defined as:

$$U = reach[\xrightarrow{may}_A][I_A]$$

That is, U is simply defined as the transitive closure over the may transitions in $M_A$ from the initial states $I_A$. It is easy to see that $reach_C(I_C) \subseteq \gamma(U)$, as the may transitions of $M_A$ over-approximate the set of transitions in $M_C$ (by Definition 4.3). Since the reachable observable states R are contained in $reach_C(I_C)$, we have that U is an over-approximation of R.

2. Pessimistic Lower Bound Computation $L_p$

A set of abstract states $X \subseteq S_A$ is a lower bound of $R \subseteq S_C$ if for each $x_a \in X$, there is a $(x_c; x_a) \in \rho$ such that $x_c \in reach_C(I_C)$.

The computation of the lower bound can be presented in two steps. First, the pessimistic lower bound ($L_p$) is defined, which makes no assumptions about $M_C$. Second, the optimistic lower bound ($L_o$) is defined, which assumes that $M_C$ does not diverge.

$L_p$ is defined as:

$$L_p = \{ v_a \mid \exists t_a, u_a : t_a \in reach[\xrightarrow{must-}_A][I_A] \land (t_a \xrightarrow{may}_A u_a \lor t_a = u_a) \land v_a \in reach[\xrightarrow{must+}_A](\{u_a\})\}$$

That is, an abstract state $v_a$ is in $L_p$ if there is a (possibly empty) sequence of must− transitions leading from $s_a \in I_A$ to $t_a$, there is a may transition from $t_a$ to $u_a$ (or $t_a$ is equal to $u_a$), and there is a (possibly empty) sequence of must+ transitions from $u_a$ to $v_a$.

For each $v_a \in L_p$, there is a $(v_c, v_a) \in \rho$ such that $v_c \in \text{reach}_C(I_C)$. That is, $L_p$ is a lower bound to R. The proof is done in three steps, corresponding to the three parts of the definition of $L_p$:

First, consider a sequence of must− transitions leading from $s_a \in I_A$ to $t_a$ in $M_A$. Each must− transition $$x_a \xrightarrow{must-} y_a$$

identifies an onto-relation from $\gamma(x_a)$ to $\gamma(y_a)$ That is, for all concrete states $y_c$ mapping to $y_a$, there is a transition $x_c \to y_c$ such that $x_c$ maps to $x_a$. The transitive closure of an onto-relation yields an onto-relation. So, for all $t_c$ mapping to $t_a$, $t_c \in \text{reach}_C(I_C)$.

Second, by the construction of $M_A$ from $M_C$ there is a may transition $$t_a \xrightarrow{may}_A u_a$$

only if there exists a transition $t_c \to u_c$, where states $t_c$ and $u_c$ map to $t_a$ and $u_a$, respectively. Since for all $t_c$ mapping to $t_a$, $t_c \in \text{reach}_C(I_C)$, it follows that if there is a may transition $$t_a \xrightarrow{may}_A u_a$$

then there is some $u_c$ mapping to $u_a$ such that $u_c \in \text{reach}_C(I_C)$.

Third, consider a sequence of must+ transitions leading from $t_a$ to $v_a$ in $M_A$. Each must+ transition $$x_a \xrightarrow{must+}_A y_a$$

identifies a total-relation from $\gamma(x_a)$ to $\gamma(y_a)$. That is, for all concrete states $x_c$ mapping to $x_a$, there is a transition $x_c \to y_c$ such that $y_c$ maps to $y_a$. The transitive closure of a total-relation yields a total-relation. So, for all $t_c$ mapping to $t_a$, there is a $v_c$ mapping to $v_a$ such that $v_c \in \text{reach}_C(\{t_c\})$.

This completes the proof that for each $v_a \in L_p$, there is a $v_c$ mapping to $v_a$ such that $v_c \in \text{reach}_C(I_C)$. 3. Optimistic Lower Bound Computation $L_o$ The optimistic computation of the lower bound ($L_o$) assumes that the program under consideration doesn't diverge (contain an infinite loop). The problem of detecting nontermination is left to testing (which is typically done by defining some timeout threshold after which a computation is declared to be non-terminating).

States that must be reached (assuming convergence) are captured using the idea of post-dominance. In our context, a state $t_a$ post-dominates $s_a$ in $M_A$ if every path of may transitions from $s_a$ to a vertex in the set $\{halt_A, error_A\}$ contains $t_a$. Post-dominance in $M_A$ is defined as the greatest fixpoint to the following set of equations:

$$pd_A(halt_A) = \{halt_A\}$$

$$pd_A(error_A) = \{error_A\}$$

$$pd_A\{s_a\} = \{s_a\} \cup \bigcap_{s_a \xrightarrow{may}_A s'_a} pd_A(\{s'_a\})$$

Using $L_p$ and $pd_A$, $L_o$ is defined as follows:

$$L_o = \{x_a | x_a \in pd_A(W_a) \wedge w_a \in L_p\}$$

It is easy to prove that if $M_C$ contains no diverging computations then for all states $w_c$ mapping to $w_a$, if $x_a \in pd_A(W_a)$ then there is a state $x_c$ mapping to $x_a$ such that $x_c \in \text{reach}_C(\{w_c\})$. Therefore, assuming that $M_C$ contains no diverging computations, for each $x_a \in L_o$, there is an $x_c$ mapping to $x_a$ such that $v_c \in \text{reach}_C(I_C)$ The lower bound L is defined as $L = L_o$.

4. Application to Partition Function Example

Let $M_A$ be the TTS constructed from concrete TTS $M_C$ (via predicate abstraction on the set of predicates $\Phi$, which induces an abstraction relation $\rho$). Let $I_C$ be the set of initial concrete states of $M_C$ and let $I_A$ be the corresponding set of initial abstract states of $M_A$ (induced by $\rho$).

Referring again to FIG. 15, the elliptical nodes represent the initial abstract states $$I_A = \{L0:TTFT, L0:TTTT, L0:TTTF, L0:TTFF\}$$

In FIG. 15, all the nodes in the graph represent the set U while the rectangular nodes represent the set L and the plaintext nodes represent the set U-L. The shading of the rectangular nodes in FIG. 15 indicates the following:

The white rectangular nodes represent those abstract states reachable from $I_A$ via a sequence of must− transitions (in our example, these are must# transitions which are, by definition, must− transitions). For example, consider the initial state L0:TTTF. There is a path of must# transitions $$L0:TTTF \xrightarrow{must\#}_A L1:TTTF \xrightarrow{must\#}_A L2:TTTF \xrightarrow{must\#}_A L3:TTTF.$$

The light-grey rectangular nodes represent those abstract states only reachable via a sequence of must− transitions, followed by one may transition, followed by a sequence of must+ transitions. Thus, the set of ovals plus the set of white and light-grey rectangular nodes represents the set $L_p$. Consider the may transition $$L3:TTTF \xrightarrow{may}_A L4:FTTF,$$

which continues the path given above. Covering this transition is the only way in which the state L4:FTTF can be reached. Then there is a path of must# transitions (which, by definition, also are must+ transitions):

$$L4:FTTF \xrightarrow{must\#}_A L2:FTTF \xrightarrow{must\#}_A L3:FTTF.$$

So, these three nodes are colored light-grey.

Finally, the dark-grey rectangular nodes represent those states in $L_o - L_p$. These are the states that must be reached under the assumption that the program does not diverge. In our example path, all the transitions leaving state L3:FTTF are may transitions. Since any path to this state must contain a may transition, the set $L_p$ will not contain any of the may successors of the state L3:FTTF. However, the state L4:FFFF is in $L_o$ and so is colored darkgrey, as every path from L3:FTTF eventually leads to L4:FFFF (assuming loops terminate).

The path given above

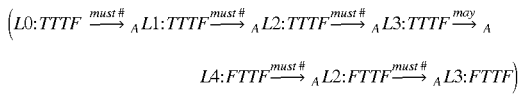

is one of the paths that leads to an array bounds error in partition function 600. Note that in this path the label L3 is covered twice, once by the state L3:TTTF and then by the state L3:FTTF. In the first state, lo<=hi, a[lo]<=pivot and a[hi]<=pivot. At label L3, lo is incremented by one. The path dictates (via covering the may transition

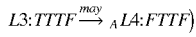

that the value of lo and hi are now equal. Because a[hi] <=pivot the loop at label L2 continues to iterate and the second state is reached, L3:FTTF, in which lo==hi and a[lo] <=pivot and a[hi]<=pivot. When lo is incremented the second time, its value becomes greater than hi, whose value still is the index of the last element of the array. Thus, the next access of a[lo] (see state L2:FFFF) will cause an array bounds violation.

F. Test Generation

The goal of test generation is to cover all the states in the lower bound L (plus any additional states). Our test generation process consists of three steps:

Path Generation: the set $L_p$ is used to guide test generation. In particular, using this set, a set of paths that are guaranteed to cover all states in $L_o$ is identified (if the program doesn't go wrong or enter an infinite loop).

Symbolic Execution: symbolic execution is used on this set of paths in order to generate test data to cover these paths.

Observe Test Runs: the program under test is run against this set of tests to check for errors and collect the set of executed observable states.

1. Path Generation

Let $I_A$ be the set of initial abstract states in $M_A$. Consider the set of states $L_p$. The goal of the path generation phase is to enumerate all paths from $I_A$ consisting of a sequence of musttransitions followed by one (and perhaps no) may transition, while covering no state more than once. This can be done by a simple depth-first search procedure. The idea is that if tests are generated to cover these paths then the rest of the states in $L_o$ will be covered if the execution of program does not go wrong (uncover an error) or diverge.

In FIG. 15, using such a depth-first search identifies ten paths. These ten paths through $L_p$ are uniquely identified by their beginning and ending vertices, as shown in the column "Path Endpoints" in the table 1800 in FIG. 18.

2. Symbolic Execution

Each of the ten paths represented in table 1800 induces a straight-line C "path" program that is automatically generated by tracing the path through the partition function 600 (FIG. 6). Consider the path from L0:TTTF to the L4:TTFF:

L0:TTTF→L1:TTTF→L2:TTTF→L3:TTTF→L4: TTFF and its corresponding path program 1900 in FIG. 19. There are four transitions between labels in this path. The transition L0:TTTF→L1:TTTF corresponds to the expression in the while loop at label L0 evaluating to true. This is modeled by the statement assume(lo<=hi) in the path program 1900 in FIG. 19. The four statements corresponding to the four transitions are presented after the "prelude" code in FIG. 19. The assert statement at the end of the path program 1900 asserts that the final state at label L4 (TTFF) cannot occur, which of course is not true.

In this example, the CBMC bounded-model checker is used to generate a counterexample to the assertion that the state L4:TTFF cannot occur. CBMC produces an input array a[ ] and array length n that will cause the assert statement to fail, proving that L4:TTFF is reachable. For the generated path program 1900 of FIG. 19, CBMC finds a counterexample and produces the input array {1, −7, 3, 0}, as shown in the second column of FIG. 18.

3. Observe Test Runs

Instrumentation of the original program both collects the executed observable states for each test run and checks for array bounds violations. In this example, there are ten runs, two of which produce array bounds violations (because the lo index is incremented past the end of the input array and then a[lo] is accessed), as shown in the third column of FIG. 18.

The set of observed states resulting from executing all ten tests contains all the states in FIG. 15 except four of the states in U-L (in particular, L5:FFFT, L6:FFFT and L7:FFFT and L3:FFTF) and the state L2:FFFF, which is unreachable due to an array bounds violation.

Fixing the error in the program and rerunning the entire process results in an upper bound U with 56 states and a lower bound L, of 37 states. Test generation succeeds in covering all 37 states in the lower bound L and causes no array bounds errors. Additionally, these tests cover six of the 19 tests in U-L. This leads us to consider whether or not the remaining states in U-L are reachable at all and to the problem of refining the upper and lower bounds.

G. Refinement of Lower and Upper Bounds

We now consider the problem of bringing the lower bound L and upper bound U closer together. We focus our attention on the observable states in U-L that were not covered by the test generation process of the previous section. The main question we wish to answer for these states is whether or not they are reachable in the original program. Automated machinery (such as the SLAM toolkit) can be used to try and answer this undecidable problem, but for many cases, we will need to involve the programmer or tester.

Consider the state L7:FFFT from FIG. 15, which is in U-L and was not covered by any test. The concretization of this abstract state is lo>hi && a[lo]>pivot && a[hi]>pivot Notice that the partition function 600 (FIG. 6), while having an array bounds error, does correctly maintain the invariant that all array elements with index less than the variable lo have value less than or equal to pivot. However, in the above state, hi<lo and a[hi]>pivot. Thus, it is not possible to reach this state.

Rather than ignoring abstract states whose concrete counterparts are unreachable, it is important to introduce new predicates to try and eliminate such states in the abstraction. The reason is that these unreachable states often will point to boundary conditions that have not yet been tested. In order to eliminate the state L7:FFFT, three new predicates can be introduced into the Boolean abstraction (in addition to the four already there) in order to track the status of the array when the variable lo takes on the value hi+1:

(lo==hi+1), (a[lo−1]<=pivot), (a[hi+1]>pivot)

These predicates track an important boundary condition that was not observed by the initial four predicates.

With these additional predicates, the generated Boolean abstraction has matching lower and upper bounds (actually $L_p$=U) and the test generation process covers all reachable observable states. As mentioned before, we cannot expect to be able to achieve matching lower and upper bounds in every case.

H. Discussion of Some Aspects of Second Combined Implementation

We now consider what it means when set of states in the upper bound U and the pessimistic lower bound $L_p$ are the same (U=$L_p$). We refer to this condition as "state simulation," as it means that every abstract state in the upper bound is observable by some execution of the concrete program. We find it useful to informally describe the states represented by these two sets using regular expressions:

- $U = [I_A](\xrightarrow{may}{}_A)^*$;
- $L_p = [I_A](\xrightarrow{must-}{}_A)^*(\xrightarrow{may}{}_A)^?(\xrightarrow{must+}{}_A)^*$ That is, U is the set of abstract states reachable (from the initial set of abstract states $I_A$) via a sequence of may transitions, while $L_p$ is the set of states reachable from $I_A$ via a sequence of must− transitions, followed by at most one may-transition, followed by a sequence of must+ transitions.

Given a path $p_a$ of abstract transitions in $M_A$ containing more than one may transition (not matched by a must transition), it is impossible to know (without analysis of $M_C$) whether or not there exists a corresponding feasible execution path $p_c$ in $M_C$. This is why the definition of $L_p$ permits at most one may transition (not matched by a must transition).

State simulation is weaker than bi-simulation, which for deterministic systems (as we consider here) reduces to trace equivalence. See Milner, *Communicating and Mobile Systems: The pi-Calculus*, Cambridge University Press (1999). An abstract TTS $M_A$ bi-simulates a CTS $M_C$ if each may transition in $M_A$ is matched by a must+ transition $$\left(\text{i.e., } \xrightarrow{may}{}_A = \xrightarrow{must+}{}_A\right).$$

It is easy to see that if $M_A$ bi-simulates $M_C$ then every abstract state in U is reachable via a sequence of must+ transitions. Therefore, U=$L_p$. Our use of must− transitions followed by at most one may-transition is the way in which we weaken bi-simulation to state simulation.

Under state simulation, every abstract state $s_a$ in U is reachable via a sequence of must− transitions, followed by at most one may transition, followed by a sequence of must+ transitions (which characterizes $L_p$). As we have shown previously, the existence of this sequence in $M_A$ implies the existence of an execution trace in $M_C$ in which $s_a$ is observed. This implies that there is a finite set of tests sufficient to observe all states in U. Since U is an upper bound to the set of reachable observable states R this set of tests covers all states in R as well (that is, R=U=$L_p$).

The upper bound U is, by construction, sound (that is, R⊆U). State simulation implies that the least fixpoint of the may-abstraction induced by the set of observation predicates is complete (that is, U⊆R)—or, more precisely, relatively complete, since we assume that abstract transitions can be computed precisely. In other words, the set U is equal to the set of observable states that would be encountered during the (infinite) computation of the least fixpoint over the concrete transition system $M_C$ (with respect to the set of initial states $I_C$). This follows from the fact that $L_p$=U. It follows that state simulation is a sufficient test for determining the completeness of a may abstraction.

To summarize, the condition of state simulation (U=$L_p$) joins together the worlds of abstraction and testing. State simulation implies both a sound and complete abstract domain that can be completely covered by a finite set of tests.

V. Comparison of Described Techniques and Tools with Other Work

Various implementations of the techniques and tools described herein guide test generation using Boolean (predicate) abstraction and model checking, and compute upper and lower bounds to the set of reachable observable states, improving on path-based testing. Various implementations of the techniques and tools described herein use the set of input predicates to bound the set of paths that will be used to generate test data for a program. The predicates induce a Boolean abstraction that guides the selection of paths.

Various implementations of the techniques and tools described herein improve on three-valued model checking with computation of lower and upper bounds. Computation of lower and upper bounds infers properties of a concrete TTS $M_C$ from analysis of an abstract TTS $M_A$. The lower bound L characterizes those observable states that are definitely reachable, the upper bound U (more precisely, its inverse S-U) characterizes those observable states that are definitely not reachable, and the reachability status of states in U-L are unknown. For example, to achieve a precise lower bound, the definition of must transitions given for MTS can be generalized to account for three types of must transitions: must+ (which correspond to must transitions in an MTS), must− and must#. In model checking of abstractions of concrete transition systems, one is interested in proving that a temporal property holds for all concrete execution paths starting from some initial abstract state. This is the reason why only must+− transitions are used in model checking of modal transitions systems. For reachability, one is interested proving the existence of some concrete execution path starting from some initial abstract state. Thus, must− transitions are of interest.

Other alternatives to path coverage include linear code sequence and jump (LCSAJ) coverage and data-flow coverage based on def-use pairs. An LCSAJ represents a sequence of statements (which may contain conditional statements) ending with a branch. An LCSAJ is an acyclic path (no edge appears twice) through a control-flow graph ending with a branch statement. PCT coverage is incomparable to path coverage for loop-free programs, so it also is incomparable to LCSAJ coverage. The goal of def-use coverage is to cover, for each definition d of a variable x and subsequent use u of variable x, a path from d to u not containing another definition of x. If there is such a path from d to u then there is an acyclic path from d to u that doesn't contain another definition of x, so again PCT coverage is incomparable to def-use coverage.

Having described and illustrated the principles of our innovations in the detailed description and the accompanying drawings, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

I claim:

1. In a computer system, a method of performing test generation for a computer program, the method comprising:
   generating a Boolean abstraction of the computer program, wherein the generating comprises selecting a set of predicates in the computer program and calculating a set of possible predicate values for plural statements in the computer program, wherein at least one of the predicates is derived from a conditional statement of the computer program;
   performing a state reachability analysis of the computer program, wherein performing the state reachability analysis comprises identifying a subset of the set of possible predicate values for the plural statements in the computer program, wherein the subset comprises an approximation of reachable states in the computer program, and outputting a set of paths that covers states in the approximation of reachable states; and
   performing symbolic execution, wherein the symbolic execution determines whether the paths are feasible and generates inputs for the computer program to cover a path when the oath is feasible.

2. The method of claim 1 further comprising, prior to calculating a set of possible predicate values for the plural statements in the computer program, generating a Boolean program based on the selected set of predicates.

3. The method of claim 1 wherein the approximation is an under-approximation of reachable states in the computer program.

4. The method of claim 3 further comprising calculating a superset of the set of possible predicate values, the superset comprising an over-approximation of reachable states in the computer program.

5. The method of claim 1 wherein the possible predicate values are possible Boolean values of the predicates.

6. The method of claim 1 wherein the generating a test comprises generating a test for a bytecode representation intermediate language.

7. A tangible computer-readable storage medium having stored thereon computer-executable instructions for performing a method of performing test generation for a computer program, the method comprising:
   generating a Boolean abstraction of the computer program, wherein the generating comprises selecting a set of predicates in the computer program and calculating a set of possible predicate values for plural statements in the computer program, wherein at least one of the predicates is derived from a conditional statement of the computer program;
   performing a state reachability analysis of the computer program, wherein performing the state reachability analysis comprises identifying a subset of the set of possible predicate values for the plural statements in the computer program, wherein the subset comprises an approximation of reachable states in the computer program, and outputting a set of paths that covers states in the approximation of reachable states; and
   performing symbolic execution, wherein the symbolic execution determines whether the paths are feasible and generates inputs for the computer program to cover a path when the path is feasible.

8. In a computer system, a method of performing test generation for a computer program, the method comprising:
   generating a Boolean abstraction of the computer program, comprising selecting a set of predicates in the computer program, and calculating a set of possible predicate values for plural statements in the computer program;
   performing a state reachability analysis of the computer program, wherein the state reachability analysis comprises finding a set of reachable states of the computer program, the state reachability analysis based at least in part on the Boolean abstraction of the computer program; and
   performing symbolic execution to generate test data for testing the computer program;
   wherein the state reachability analysis further comprises computing an upper bound of reachable observable states of the computer program, comprising states with valid correlations between the predicates in the set of predicates;
   wherein the state reachability analysis further comprises computing a lower bound of reachable observable states of the computer program, the lower bound comprising states reachable from states with valid correlations between the predicates in the set of predicates;
   wherein the state reachability analysis further comprises outputting a set of paths that covers states in the upper bound of reachable states; and
   wherein the symbolic execution comprises determining whether the paths are feasible and generates inputs for the computer program to cover a path when the path is feasible.

9. A tangible computer-readable storage medium having stored thereon computer-executable instructions for performing a method of performing test generation for a computer program, the method comprising:
   generating a Boolean abstraction of the computer program, comprising selecting a set of predicates in the computer program, and calculating a set of possible predicate values for plural statements in the computer program;
   performing a state reachability analysis of the computer program, wherein the state reachability analysis comprises finding a set of reachable states of the computer program, the state reachability analysis based at least in part on the Boolean abstraction of the computer program; and
   performing symbolic execution to generate test data for testing the computer program;
   wherein the state reachability analysis further comprises computing an upper bound of reachable observable states of the computer program, comprising states with valid correlations between the predicates in the set of predicates;
   wherein the state reachability analysis further comprises computing a lower bound of reachable observable states of the computer program, the lower bound comprising the states reachable from states with valid correlations between the predicates in the set of predicates;

wherein the state reachability analysis further comprises outputting a set of paths that covers states in the upper bound of reachable states; and wherein the symbolic execution comprises determining whether the paths are feasible and generates inputs for the computer program to cover a path when the path is feasible.

10. In a computer system, a method of modeling behavior of a computer program:

generating a Boolean abstraction of the computer program, wherein the generating comprises deriving an initial plurality of predicates; wherein a predicate is derived from at least one of a conditional statement, an assertion, or a run-time safety check of the computer program;

performing a state reachability analysis of the computer program, wherein performing the state reachability analysis comprises defining an upper bound for a set of reachable observable states in the computer program wherein the reachable observable states comprise an evaluation of a state of the predicate at a statement in the computer program;

defining a lower bound for the set of reachable observable states in the computer program;

using the upper bound and the lower bound to form a static coverage metric of the computer program, which measures an amount of test coverage;

forming a behavior model of the computer program using the upper and lower bound, wherein forming the behavior model comprises outputting a set of oaths that covers states in the lower bound for the set of reachable observable states in the computer program;

performing symbolic execution, wherein the symbolic execution determines whether the paths are feasible and generates inputs for the computer program to cover a path out of the paths when the path is feasible and comprises performing test generation of reachable states based at least in part on the behavior model wherein a percentage of reachable observable states are covered by a generated test; and adding new predicates to the initial plurality of predicates to increase percentage of reachable observable states covered by a generated test.

11. The method of claim 10 wherein the defining the lower bound comprises a pessimistic lower bound computation.

12. The method of claim 10 wherein the defining the lower bound comprises an optimistic lower bound computation.

13. The method of claim 10 further comprising performing test generation based at least in part on the behavior model.

14. The method of claim 13 wherein the test generation comprises generating tests for a subset of the reachable observable states defined by the lower bound prior to generating tests for other reachable observable states.

15. The method of claim 13 further comprising:
increasing the lower bound; and
using the increased lower bound in the test generation.

16. The method of claim 13 further comprising:
decreasing the upper bound; and
using the decreased upper bound in the test generation.

17. The method of claim 15 wherein the increasing the lower bound comprises refining Boolean abstraction for the computer program.

18. A tangible computer-readable storage medium having stored thereon computer-executable instructions for performing a method of modeling behavior of a computer program:

generating a Boolean abstraction of the computer program, wherein the generating comprises deriving an initial plurality of predicates; wherein a predicate is derived from at least one of a conditional statement, an assertion, or a run-time safety check of the computer program;

performing a state reachability analysis of the computer program, wherein performing the state reachability analysis comprises defining an upper bound for a set of reachable observable states in the computer program wherein the reachable observable states comprise an evaluation of a state of the predicate at a statement in the computer program;

defining a lower bound for the set of reachable observable states in the computer program;

using the upper bound and the lower bound to form a static coverage metric of the computer program, which measures an amount of test coverage;

forming a behavior model of the computer program using the upper and lower bound, wherein forming the behavior model comprises outputting a set of paths that covers states in the lower bound for the set of reachable observable states in the computer program;

performing symbolic execution, wherein the symbolic execution determines whether the paths are feasible and generates inputs for the computer program to cover a path out of the paths when the path is feasible and comprises performing test generation of reachable states based at least in part on the behavior model wherein a percentage of reachable observable states are covered by a generated test; and adding new predicates to the initial plurality of predicates to increase percentage of reachable observable states covered by a generated test.

19. The method of claim 10 wherein performing test generation comprises:

1) generating paths to cover the lower bound for the set of reachable observable states in the computer program;

2) symbolically executing the generated paths to generate test data to cover the paths; and 3) running the computer program against the generated test data.

20. The method of claim 19 wherein the generating paths uses a depth first procedure to identify must transitions followed by zero or one may transition.

21. The method of claim 17 wherein adding new predicates to the plurality of predicates to increase percentage of reachable observable states covered by a generated test comprises adding a predicate that tracks a boundary condition that was not observed by the initial plurality of predicates.

22. The method of claim 10 wherein defining a upper bound for the set of reachable observable states in the computer program comprises choosing states wherein states corresponding to infeasible correlations between the predicates in the initial plurality of predicates are excluded.

23. The method of claim 10 wherein a reachable state is a state without an inherent logical contradiction between predicates.

* * * * *

UNITED STATES PATENT AND TRADEMARK OFFICE
CERTIFICATE OF CORRECTION

PATENT NO.        : 7,584,455 B2                                          Page 1 of 1
APPLICATION NO.   : 10/844710
DATED             : September 1, 2009
INVENTOR(S)       : Thomas J. Ball It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fourteenth Day of September, 2010

David J. Kappos
*Director of the United States Patent and Trademark Office*